United States Patent
Blersch et al.

(10) Patent No.: US 10,627,002 B2
(45) Date of Patent: Apr. 21, 2020

(54) TRANSMISSION CONTROL DEVICE

(71) Applicant: REINZ-DICHTUNGS-GMBH, Neu-Ulm (DE)

(72) Inventors: Robert Blersch, Baltringen (DE); Oliver Claus, Laichingen (DE); Georg Egloff, Weibenhorn (DE); Kurt Hoehe, Langenau (DE); Matthias Pendzialek, Ulm (DE)

(73) Assignee: Reinz-Dichtungs-GmbH, Neu-Ulm (DE)

(*) Notice: Subject to any disclaimer, the term of this patent is extended or adjusted under 35 U.S.C. 154(b) by 245 days.

(21) Appl. No.: 15/737,468

(22) PCT Filed: Jun. 29, 2016

(86) PCT No.: PCT/EP2016/065183
§ 371 (c)(1),
(2) Date: May 23, 2018

(87) PCT Pub. No.: WO2017/001505
PCT Pub. Date: Jan. 5, 2017

(65) Prior Publication Data
US 2018/0306337 A1    Oct. 25, 2018

(30) Foreign Application Priority Data

Jun. 29, 2015    (DE) .................... 20 2015 103 420 U

(51) Int. Cl.
*F16K 15/14*    (2006.01)
*F16H 61/00*    (2006.01)
(Continued)

(52) U.S. Cl.
CPC ....... *F16K 15/144* (2013.01); *F16H 61/0009* (2013.01); *F16J 15/064* (2013.01);
(Continued)

(58) Field of Classification Search
CPC .. F16K 15/144; F16K 15/023; F16H 61/0009; Y10T 137/7895
See application file for complete search history.

(56) References Cited

U.S. PATENT DOCUMENTS

| | | | |
|---|---|---|---|
| 2,015,915 A | 3/1933 | Adsit | |
| 2,643,914 A | * 6/1953 | Reswick | ................ B65D 83/75 222/394 |

(Continued)

FOREIGN PATENT DOCUMENTS

| | | |
|---|---|---|
| CN | 102959279 A | 3/2013 |
| CN | 103459140 A | 12/2013 |

(Continued)

OTHER PUBLICATIONS

European Patent Office, International Search Report with Written Opinion, issued in PCT/EP2016/065183, dated Sep. 12, 2016, 15 pages, European Patent Office, Rijswijk, Netherlands.

(Continued)

*Primary Examiner* — Jessica Cahill
(74) *Attorney, Agent, or Firm* — Marshall & Melhorn, LLC

(57) ABSTRACT

A transmission control device has two mutually oppositely arranged counter-components, for example control boxes, and a planar transmission control plate, which is arranged between the two counter-components. The transmission control plate seals the clearance between the two counter-components or their channel portions and bores in the form of a flat seal. The plate also provides through-openings between channels or bores, respectively, in the opposing counter-components, where the fluid in the channels controls the function of a transmission. The sealing function is realized by stamped beads and/or partial coatings. Transmission control plates therefore have fluid through-flow openings so the fluid can flow through from one side of the (Continued)

plate to the other side of the plate. Additional functional elements can be present in the through-flow openings, for example valve elements which stop the through-flow in one direction or combined valve-orifice elements, which restrict the through-flow in one or both directions.

25 Claims, 13 Drawing Sheets

(51) Int. Cl.
*F16K 15/02* (2006.01)
*F16J 15/06* (2006.01)
*F16J 15/08* (2006.01)

(52) U.S. Cl.
CPC ....... *F16J 15/0818* (2013.01); *F16J 15/0825* (2013.01); *F16K 15/023* (2013.01)

(56) References Cited

U.S. PATENT DOCUMENTS

| | | | | |
|---|---|---|---|---|
| 5,388,615 | A * | 2/1995 | Edlund | B65D 51/1644 137/859 |
| 6,659,094 | B2 * | 12/2003 | Nakamizo | F01M 13/0011 123/572 |
| 7,971,598 | B1 * | 7/2011 | Hoeptner, III | E03C 1/102 137/217 |
| 9,897,208 | B2 | 2/2018 | Hoehe et al. | |
| 2009/0166575 | A1 * | 7/2009 | Bereznai | F16K 21/02 251/368 |
| 2014/0238497 | A1 * | 8/2014 | Jones | F16K 15/144 137/1 |
| 2015/0198250 | A1 * | 7/2015 | Hoehe | F16H 61/0009 277/641 |
| 2018/0252309 | A1 * | 9/2018 | Blersch | F16H 61/0009 |

FOREIGN PATENT DOCUMENTS

| | | |
|---|---|---|
| CN | 103814242 A | 5/2014 |
| CN | 103867334 A | 6/2014 |
| CN | 103867723 A | 6/2014 |
| CN | 104271995 A | 1/2015 |
| CN | 104685268 A | 6/2015 |
| DE | 202007004323 U1 | 7/2008 |
| DE | 102008062829 A1 | 7/2010 |
| DE | 102009024091 A1 | 12/2010 |
| DE | 102008062829 B4 | 6/2013 |
| DE | 202012009539 U1 | 1/2014 |

OTHER PUBLICATIONS

The International Bureau of WIPO, English translation of the International Preliminary Report on Patentability Issued in PCT/EP2016/065183, dated Jan. 2, 2018, 7 pages, The International Bureau of WIPO, Geneva, Switzerland.

China National Intellectual Property Administration, Chinese Office Action in Application No. 201680044502.1, dated May 23, 2019, 19 pages.

* cited by examiner

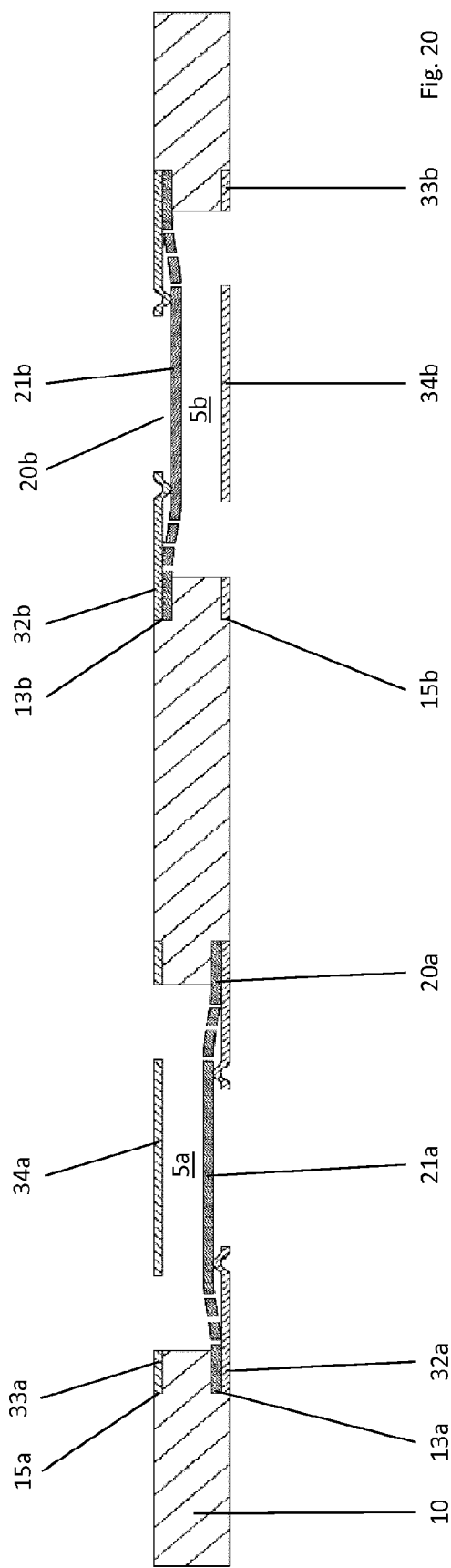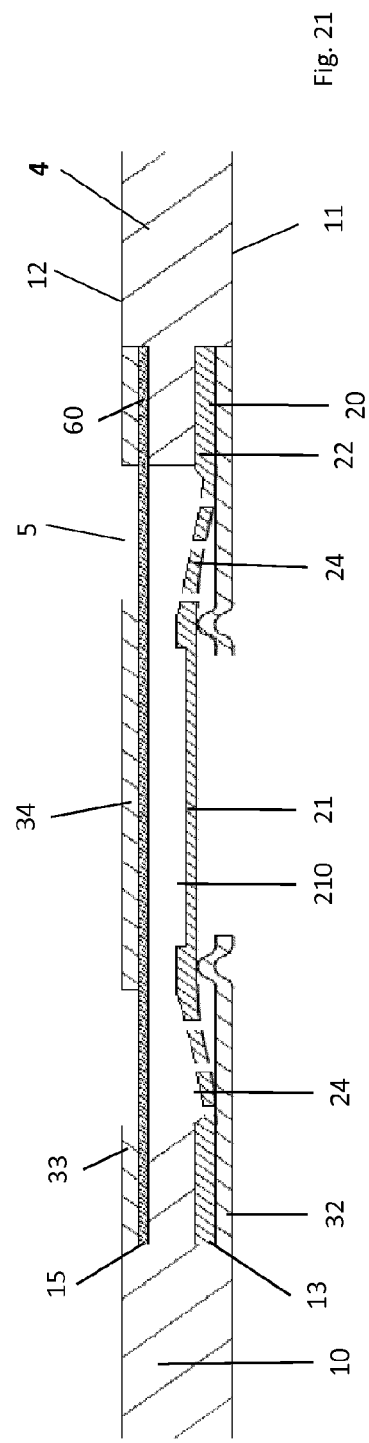

TRANSMISSION CONTROL DEVICE

BACKGROUND OF THE INVENTION

The present invention relates to a transmission control device. Such transmission control devices conventionally have two mutually oppositely arranged counter-components, for example control boxes, and a planar transmission control plate which is arranged between the two counter-components. This transmission control plate has, on the one hand, the task of sealing the clearance between the two counter-components or their channel portions and bores in the form of a flat seal and, on the other, the task of providing through-openings between channels and bores in the opposing counter-components, wherein the fluid in the channels controls the function of a transmission. The sealing function here is conventionally realized by stamped beads and/or partial coatings. Transmission control plates therefore have through-flow openings for a fluid via which the fluid can flow through from one side of the transmission control plate to the other side of the transmission control plate. Additional functional elements can be present in such through-flow openings, for example valve elements which stop the through-flow in one direction or combined valve-orifice elements, which restrict the through-flow in one or both directions.

DE 20 2012 009 539 U1, for example, thus discloses a transmission control plate in which a movable valve element is arranged within a through-flow opening in the transmission control plate. The implementation of the holder for such functional elements is conventionally realized by additional measures and is complex and expensive.

SUMMARY OF THE INVENTION

Starting from this prior art, it is therefore the object of the present invention to provide a transmission control device in which valves or valve-orifice combinations can be realized simply, economically and reliably.

This object is achieved by the transmission control device as claimed in claim 1 or claim 26. Advantageous further developments of the transmission control device according to the invention are described in the dependent claims. The transmission control device according to the invention has two mutually oppositely arranged counter-components. These can be for example control boxes (lower box and upper box) and the like. At least one counter-component here can also be in several parts. A planar transmission control plate is furthermore located between the two oppositely arranged counter-components. The transmission control plate has at least one through-flow opening for a fluid which is in communication with at least one respective fluid channel and/or a bore in the counter-components, in particular in communication with fluid channels on both sides of the transmission control plate or in particular in communication with bores on both sides of the transmission control plate or in particular in communication with a fluid channel and a bore, each on one side, i.e. on different sides of the transmission control plate.

The fluid channels in the counter-components extend parallel to the plane of the transmission control plate. The bores extend perpendicularly or at least substantially perpendicularly to the plane of the transmission control plate.

The through-flow opening extends here through the layers and elements of the transmission control plate between both surfaces of the transmission control plate. However, it does not have to extend continuously perpendicularly to the transmission control plate but can also have an offset, e.g. in the carrier layer. Branches are likewise possible.

As with conventional transmission control plates, the transmission control plate according to the invention has at least one planar carrier layer. Unless otherwise indicated specifically, the central plane of this carrier layer is intended to define the plane of the transmission control plate. The carrier layer now has, on a first side, along the circumferential edge of the said at least one through-flow opening, a first step-shaped first recess set back from the through-flow opening. This recess can be provided continuously along the circumferential edge or only in some portions.

A spring element is mounted in this recess. This spring element has a spring plate which is arranged within the through-flow opening in the carrier layer, projecting perpendicularly onto the plane of the transmission control plate. The spring plate is connected radially outwards via holding arms to a holding region of the spring element, which is in turn arranged in the said recess.

The transmission control device according to the invention enables the through-flow of a fluid through the at least one through-flow opening to be realized only in one direction, for example in that direction in which an (annular) gap opens in the spring element, so that the fluid can flow through this gap or through separate through-openings in the spring element and on through the through-opening to the other side of the transmission control plate. This flow direction is referred to below as the main flow direction.

In particular owing to its inherent rigidity, the construction of the valve or valve-spring element therefore enables reproducible sealing and control of the fluid, even if that region of the transmission control plate which borders the valve or valve-spring element is not seated and supported circumferentially on at least one counter-component or, in the event of a connection between two channels, on both counter-components.

If the recess in the direction seen perpendicularly to the carrier layer plane has at least the same thickness as the thickness of the holding region of the spring element, the spring element in turn does not add to the thickness of carrier layer. The overall thickness of the transmission control plate is maintained in this respect.

The spring plate is preferably connected in one piece to the holding region of the spring element via holding arms. These can proceed for example spirally from the spring plate. If the spring plate is now deflected perpendicularly to the carrier layer plane, then the openings between the spiral arms widen. If the valve is opened here, the spiral arms can open a passage for the fluid perpendicularly to the carrier layer plane. Alternatively, through-openings arranged outside the spring plate in the spring element are possible. It is also possible for the spring plate to be pre-tensioned and for the openings between the spiral arms to open as the valve is closed. Through a suitable design of the holding arms of the spring element, it is therefore possible to assist the valve function of the spring plate.

The transmission control plate advantageously furthermore has a first functional element or a first functional layer. This first functional element is arranged in or on the carrier layer, on the side with the spring element. In the case of a first functional layer, this is arranged on the carrier layer on the side with the spring element. The first functional element or the first functional layer advantageously likewise has a through-flow opening whereof the inner width is advantageously smaller than the inner width of the through-flow opening in the carrier layer, wherein both through-flow openings are arranged in succession in the through-flow direction. This first functional element or this first functional layer advantageously overlaps the holding region of the spring element.

The through-flow opening in the first functional element or layer and the spring plate can now be designed such that, in the unloaded state of the spring plate, the spring plate is seated on that region of the first spring element or the first functional layer which borders the circumferential edge of the through-flow opening and closes the through-flow opening. This realizes a stoppage function of the spring element in a through-flow direction, namely against the main flow direction. The bordering region of the first functional element or the first functional layer refers here to that region of the functional element or the functional layer which directly adjoins the circumferential edge of the through-opening.

In the region bordering the circumferential edge of the through-flow opening, a seating and/or sealing element, which protrudes in the direction of the spring plate and on which the spring plate can be seated, can be additionally arranged along the circumferential edge of the through-flow opening in the first functional element or in the first functional layer. By definition, the seating and/or sealing element is included in the region bordering the circumferential edge of the through-flow opening.

An improved stoppage function of the spring plate can be achieved by the seating and/or sealing element. This seating and/or sealing element can be an elastic sealing bulge or a profile, a bead or a folded flange. With a suitable design, the spring plate is already deflected, and therefore pre-tensioned, in the through-flow direction by the seating and/or sealing element.

If a bead is used as the seating and/or sealing element, one or more flanks of the bead can have a reduced flank thickness, in particular a flank thickness which is reduced by ≥15%, preferably by ≥22%, relative to the thickness at the head of the bead, wherein the thicknesses are each determined perpendicularly to the neutral axis of the layer. The rigidity of the bead can thus be increased or generally set specifically. The same applies to a folded flange wherein the thickness of the folded region is preferably reduced by ≥8% with respect to the thickness of the bordering, non-folded region.

On the second side opposite the spring element, the transmission control plate advantageously has a second functional element or a second functional layer. The second functional layer or the second functional element likewise possesses a through-flow opening, which is arranged downstream of the through-flow opening of the carrier layer in the through-flow direction of the fluid. This second functional layer and/or the second functional element can now be designed as described in the previous five paragraphs in the same way as the first functional layer or the first functional element, in particular with a valve opening which can be closed by the spring plate. To this end, the spring plate can be pre-tensioned in the direction of the second functional layer or the second functional element.

A travel delimiting element can advantageously be arranged in the through-flow opening of the second functional layer or the second functional element as part of the second functional layer or the second functional element. This travel delimiting element delimits the maximum possible deflection of the spring plate in the direction of the second side of the carrier layer, i.e. where applicable in the through-flow direction. This travel delimiting element can advantageously be connected in one piece, via holding arms, to that region of the second functional layer or the second functional element which surrounds the through-flow opening. The travel delimiting element is advantageously arranged concentrically to the spring plate so that, with a maximum deflection, the spring plate is seated centrally on the travel delimiting element.

The travel delimiting element can advantageously be connected at at least two connecting points to the circumferential edge of the through-flow opening of the carrier layer or the associated functional layer. The connection is advantageously realized via one or more pairs of adjacent connecting points, which can likewise be part of the carrier layer or the functional layer. These can advantageously be arranged along the circumferential edge of the carrier layer or the functional layer such that the centers of the connecting points of mutually adjacent connecting points are arranged offset from one another through at least 85° along the circumferential edge of the through-opening.

As connecting elements, it is possible to use one or more webs, for example, which jut into the through-flow opening in a projection of the transmission control plate perpendicularly to its planar extent and which are connected to one another where applicable at their ends jutting into the through-flow opening. In this arrangement, they can form a common web spanning the through-flow opening or they can form a star with three or more web elements in the region in which they are connected to one another.

It is also possible to provide only one or a plurality of arms or webs jutting into the through-flow opening as travel delimiting elements. To this end, it is then advantageous if the web has a minimum width of 0.1 to 0.9 mm and/or is connected in one piece to the spring element which surrounds the relevant through-flow opening from which this web is formed over a segment of at least 25°, advantageously at least 30°, of the circular circumference of the circumferential edge of the through-opening. The latter is in particular advantageous for individual webs which do not cooperate with further web elements. In individual cases, the attachment of the web here can extend over up to 180° of the circular circumference. However, the connection is not usually greater than a segment of 120°, preferably 90°, in particular 60°.

The travel delimiting element can advantageously be elastically mounted and thus form a resilient stop for the spring plate. The spring rates for the spring element and for this elastically mounted travel delimiting element can be selected differently. It is thus possible to design the opening behavior of the spring plate variably along the opening travel path. For example, the travel delimiting element can have a higher spring rate than the spring element, so that, with the same pressure on the spring plate, the opening movement of the spring plate after contact with the elastically mounted travel delimiting element proceeds considerably more slowly or with a smaller deflection.

Both the spring plate and the travel delimiting element can have a deformation, for example a stamped portion, which protrudes out of the spring plate or the travel delimiting element against the flow direction of the fluid (passage direction of the spring plate). This can be designed as a generally convex formation or in the form of a cup. This convex or cup-shaped stamped portion serves as a flow guiding element for the fluid flowing through, which is guided around the spring plate or the travel delimiting element here. This reduces the flow resistance of these elements.

If the second functional layer contains the valve opening, the first functional layer can have a travel delimiting element. This can be formed as described above.

Such a travel delimiting element can alternatively also be formed by the second functional element instead of by the second functional layer. This second functional element can be designed identically to the second functional layer in the region of the through-opening. It then has a holding region, which surrounds the circumferential edge of the through-flow opening, at least in some regions, and can be arranged in a further recess of the carrier layer which is arranged on the second side of the carrier layer. It is also possible here to design the depth of the recess to correspond with the thickness of the holding region of the second functional element. A second functional layer is then unnecessary if its function in the region of the through-flow opening is already assumed by a second functional element. The transmission control plate can thus advantageously have a smaller thickness. However, it is essentially also possible to design the depth of the recess such that it is greater or less than the thickness of the holding region.

In the same way, the first functional element can be replaced by a first functional layer which is designed in the same way as the first functional element described above in the region of its through-opening. A cutout in the carrier layer for the first functional element is then no longer necessary.

The first and/or second functional layer preferably have a surface area whereof the outer edges are substantially the same as the surface area of the outer edges of the carrier layer.

The transmission control device according to the invention enables a fluid to flow through the at least one through-flow opening in only one direction, namely in that direction in which the spring plate lifts off its seat on the first functional layer or on the first or second functional element owing to the fluid pressure. An (annular) gap thus opens between the circumferential edge of the through-opening in the functional layer or the functional element and the spring plate so that the fluid can flow through this gap and on through the through-opening in the carrier layer to the other side of the transmission control plate. In the opposite direction, the spring plate is pressed onto the valve opening by the pressure of the fluid and thus stops the passage of fluid through the through-flow opening. If this is a combined valve-orifice element, a total stoppage is not established when the spring plate is closed; rather, a restricted fluid flow against the main flow direction is still possible.

Advantageously, the above-mentioned travel delimiting element can additionally have flow guiding elements. These can protrude for example perpendicularly or obliquely out of the functional region so that they set the fluid flowing through into rotational motion.

It is furthermore advantageously possible to provide the travel delimiting element with an additional through-flow opening, for example to facilitate the release of the spring plate from the travel delimiting element again. The spring plate of the spring element can also be provided with a through-flow opening, wherein this through-flow opening ensures an orifice effect and therefore a reduced flow volume against the main flow direction.

The travel delimiting element itself can be elastically mounted so that it forms a resilient travel delimiter. In addition to this travel delimiting element, it is also possible to provide, spaced from this, in particular spaced as a result of an angled portion, in a further functional layer or in a further functional element, a further, rigid second travel delimiting element which in turn delimits the deflection of the first elastic travel delimiting element. With a suitable design of the spring rates both of the holding arms of the spring plate and the first travel delimiting element, for example when using a higher spring rate for the first travel delimiting element than for the spring plate, it is possible to design the opening characteristic of the spring plate individually along its deflection path.

In a particular design, the first travel delimiting element and/or the spring plate can be concavely curved in the direction of the first functional element or the first functional layer, i.e. against the through-flow direction of the fluid, so that the travel delimiting element and/or the spring plate exhibit a reduction in the flow resistance for the fluid in the through-flow direction. It is likewise possible to provide a concave curvature of the travel delimiting element in the direction of the second functional element or the second functional layer.

As a result of the above-described design of a through-flow opening through a transmission control plate, it is possible for a valve which stops the through-flow of the control fluid in one direction, or a combined valve-orifice element which restricts the through-flow of the control fluid in one or both directions, to be provided in the transmission control plate, wherein the thickness of the transmission control plate can be kept small. The above design of the through-flow opening can furthermore be realized economically.

It is moreover possible to design a plurality of through-flow openings as described above. The design of a through-flow opening here can also be realized in a mirror-symmetrical manner so that a stoppage or orifice effect is achieved perpendicularly to the plane of the transmission control plate. It is therefore possible for one or more through-flow openings in a transmission control plate to be designed according to the invention, wherein the arrangement in each case is realized to stop or reduce the flow in the direction against the desired flow direction. Furthermore also possible are embodiments which alternate between a route through the transmission control plate and a route between two channels and bores on the same surface of the transmission control plate, so-called "OR circuits". In intermediate states, i.e. when the spring plate is not lying against either side, reduced flows are possible in the case of simple stop valves, whilst, in OR circuits, the fluid can follow both flow paths at the same time.

In a further design according to the invention, it is possible for the recesses to not be in the carrier layer of the transmission control plate but in the adjacent counter-components. This can be realized both for the counter-component adjacent to the first side of the carrier layer and also additionally or alternatively for the counter-component adjacent to the second side of the carrier layer. To this end, corresponding recesses are provided in the relevant counter-component.

Several examples of transmission control devices according to the invention are described below. A multiplicity of advantageous features of a transmission control device according to the invention are illustrated here in each case in conjunction with one another. These individual optional features can, however, not only develop the present invention together but also individually or in combination with other optional features from other examples. Transmission control devices can contain sealing elements, e.g. in the form of coatings and/or beads, in the region around their through-openings and/or around channels, in particular in the counter-components, but also on the outermost layers, for example. However, an illustration of such sealing elements has not been included here.

Identical or similar reference signs have been used for identical or similar elements so a description thereof is not always repeated.

BRIEF DESCRIPTION OF THE DRAWINGS

The drawings show:

FIGS. 18 to 26 a further embodiment in each case of a transmission control device according to the invention.

DETAILED DESCRIPTION OF THE INVENTION

Figure 1:
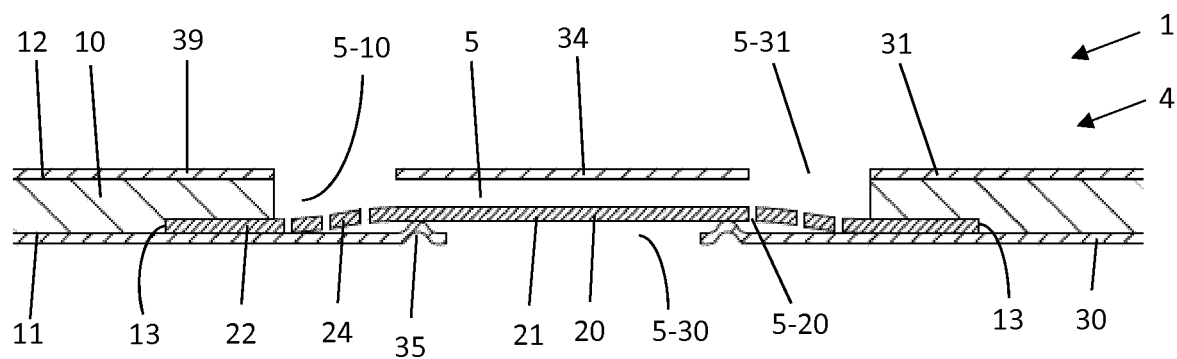
FIGS. 1 to 3 a partial view of three different transmission control plates according to the invention in cross-section.

FIG. 1 shows a transmission control plate 4 of a transmission control device 1 which is not illustrated in full. This transmission control plate has a carrier layer 10, a first functional layer 30 and a second functional layer 31. A respective counter-component (not illustrated here), for example a control box, is arranged on each side of the functional layers 30 and 31.

The transmission control plate 4 has a through-flow opening 5 which can be designed differently in the individual layers of the transmission control plate 4. It is therefore provided with a corresponding reference sign for the respective layers, for example as 5-10 for the part of the through-flow opening through the transmission control plate which is formed by the through-flow opening of the carrier layer 10.

The inner width of the through-flow opening 5-10 is therefore greatest in the carrier layer 10.

The carrier layer 10 has a first side 11, which is directed towards the first functional layer 30, and a second side 12, which is directed towards the second functional layer 31. On the first side 11, the through-flow opening 5-10 is surrounded by a recess 13 in which a holding region 22 of a spring element 20 is arranged. The holding region 22 here can be connected to the carrier layer by welding, soldering, caulking, adhesion or otherwise. An advantageous connection is produced for example when the holding region 22 has a bead—in particular circumferentially—so that, when the bead is pressed, the outer edge of the holding region 22 is pressed outwards and pushed against the edge of the recess 13. With a suitable design, it is also sufficient to arrange this holding region 22 between the carrier layer 10 and the first functional layer 30 so that the carrier layer 10 and the first functional layer 30 hold the spring element 20.

The holding region 22 is connected via holding arms 24 to a spring plate 21 arranged radially centrally in the through-flow opening 5-10. The spring plate is resiliently/elastically mounted via the holding arms 24. If there are no differences in pressure between the two sides of the spring plate, the spring plate 21 is seated on a bead 35 which rises in the direction of the spring plate 21 and is formed along the circumferential edge of the through-opening 5-30 of the first functional layer 30. On the one hand, this bead 35 forms a seat and a sealing line and, on the other, it serves for the pre-tensioning of the spring plate.

If a fluid now flows against the spring plate from below (in the drawing), the spring plate is pushed upwards. However, the movement of the spring plate 21 is delimited by a travel delimiting element 34, which is arranged centrally in the through-flow opening 5-31 in the second functional layer 31. This travel delimiting element 34 is connected via holding arms (not visible in this cross-section) to a holding region 39 of the second functional layer 31. With a sufficiently high pressure on the spring element 21, this is now deflected upwards as far as the travel delimiter on the travel delimiting element 34 so that the fluid can flow through the through-flow opening 5-30 in the first layer 30, the through-flow opening 5-20 between the holding arms 24 of the spring element 20, the through-flow opening 5-10 in the carrier layer 10 and the through-flow opening 5-31 between the travel delimiting element 34 and the holding region 39 of the second functional layer 31.

However, the fluid is not able to flow in the opposite direction since the spring plate 21 in this case locks in a sealing manner with the sealing element 35 advantageously extending completely around the through-opening 5-30 and has a closed area.

Figure 2:
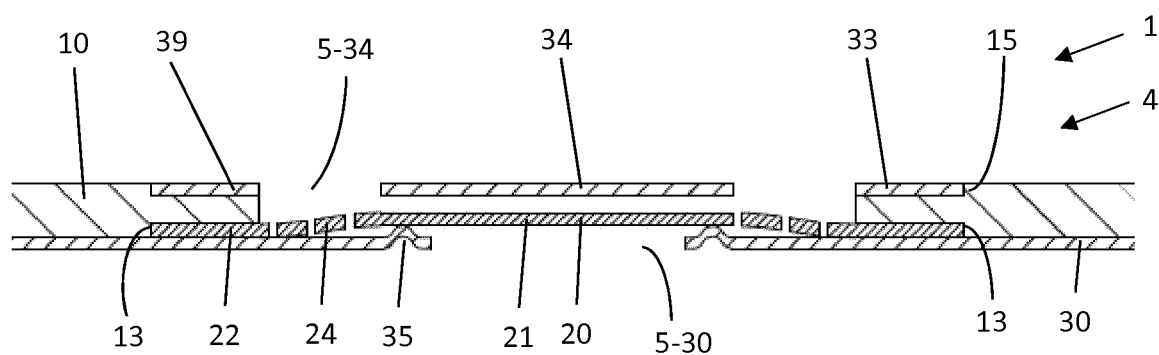

A further design of the transmission control plate 4 according to the invention is illustrated in FIG. 2. This is designed substantially similarly to that in FIG. 1. However, the second functional layer 31 is now replaced by an identically designed second functional element 33, wherein the holding region 39 of the functional element 33 is arranged in a second recess 15 in the carrier layer 10.

Figure 3:
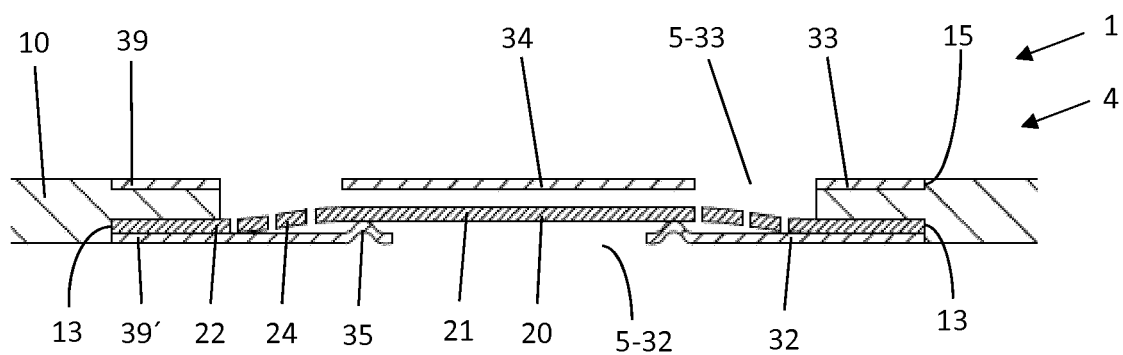

A further embodiment of the transmission control plate 4 according to the invention is illustrated in FIG. 3. This is designed similarly to the transmission control plate in FIG. 2. However, the first functional layer 30 is now also replaced by an identically designed first functional element 32. This first functional element 32 has the same outer circumference as the spring element 20. The cutout 13 now has a certain thickness perpendicularly to the plane of the carrier layer, which corresponds to the sum of the thicknesses of the holding region 22 of the spring element 20 and the holding region 39' of the first functional element 32. The first functional element 32 is thus embedded flush in the carrier layer 10. This embodiment enables a minimum structural height of the transmission control plate 4 according to the invention.

Although, in FIGS. 1 to 3, the elements—in this case the spring element 20, the second functional element 33 and the first functional element 32—inserted into the recesses—in this case the recesses 13, 15—are always illustrated such that the inserted elements are flush with the edge of the recesses 13, 15, this is not compulsory. Instead, it is also possible to install the inserted elements at a spacing from the edge of the recesses, in particular to compensate manufacturing tolerances.

Figure 4:
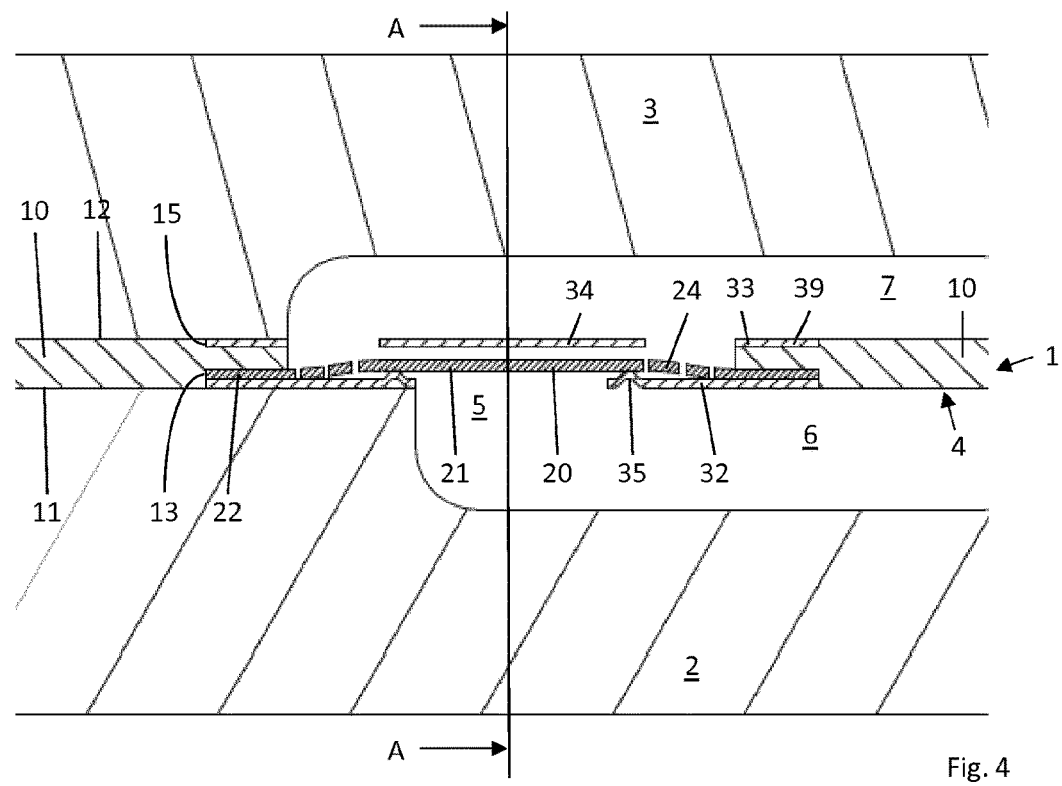
FIGS. 4 to 8 a partial view of different transmission control devices according to the invention in cross-section.

FIG. 4 shows a transmission control device 1. This transmission control device 1 has a lower box 2 and an upper box 3 in which channels 6 and 7 are incorporated. A transmission control plate 4, as illustrated in FIG. 3, is arranged between the lower box 2 and the upper box 3. In this Figure, only the detail around the through-opening 5 is illustrated.

The through-opening 5 now connects the channels 6 and 7, wherein the channels 6 and 7 each extend parallel to the layer plane of the transmission control plate 4 or the transmission control device 1 including the lower box 2 and the upper box 3. The channels 6 and 7 are delimited to the left. The fluid flows from right to left in channel 6, passes through the through-flow opening 5 into the channel 7 and flows on to the right. A backflow is prevented by the spring plate 21 seated on the seating/sealing element 35.

Figure 5:
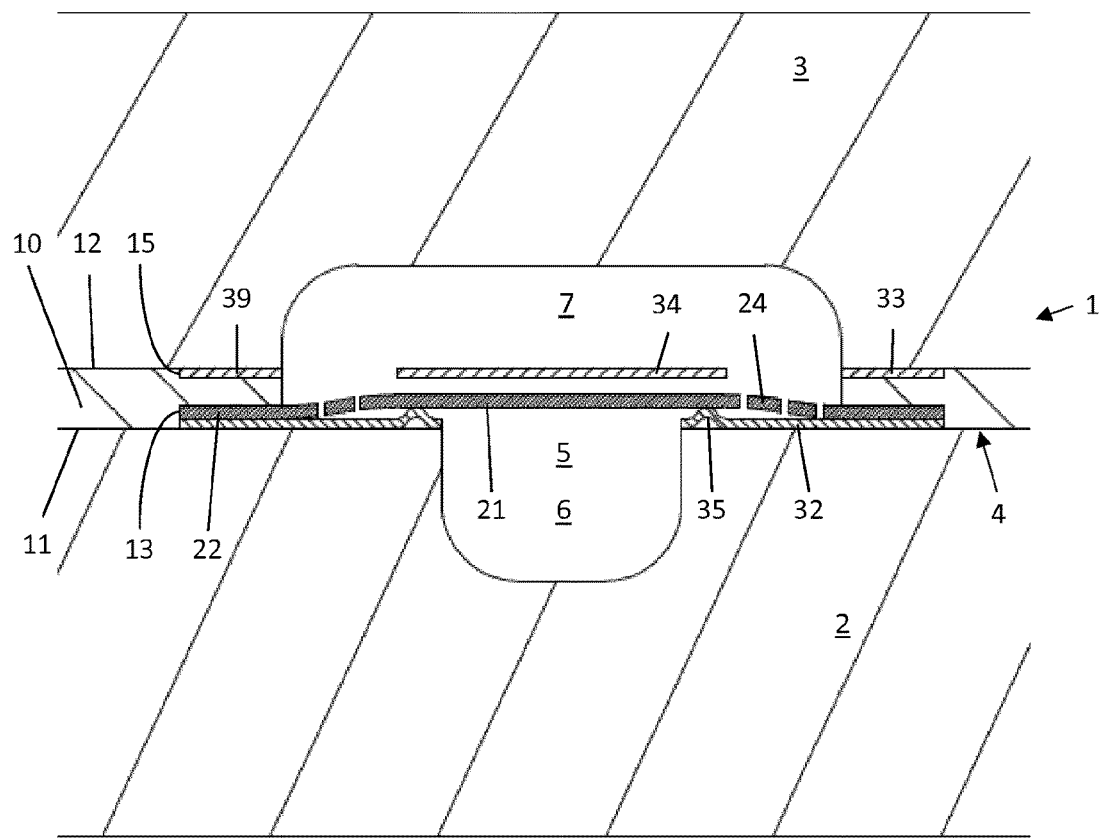

FIG. 5 shows a section through the transmission control device 1 of FIG. 4 along the line A-A. In this illustration, the width of channel 6 in the lower box 2 is shown to be smaller than the width of the channel 7 in the upper box 3, wherein the width is determined in each case parallel to the layer plane of the transmission control plate 4.

Looking at FIGS. 4 and 5 together, it is clear that both the first functional element 32 and the second functional element 33 are not seated on the control boxes 2 and 3 in some portions, namely in the region which is illustrated on the right in FIG. 4 and serves as the continuation of the two channels 6 and 7. This means that the valve construction according to the invention itself has sufficient inherent rigidity to ensure both the opening of the valve, i.e. the lifting of the spring plate 21, and the closing and sealing of the valve in a durable and reproducible manner.

Figure 6:
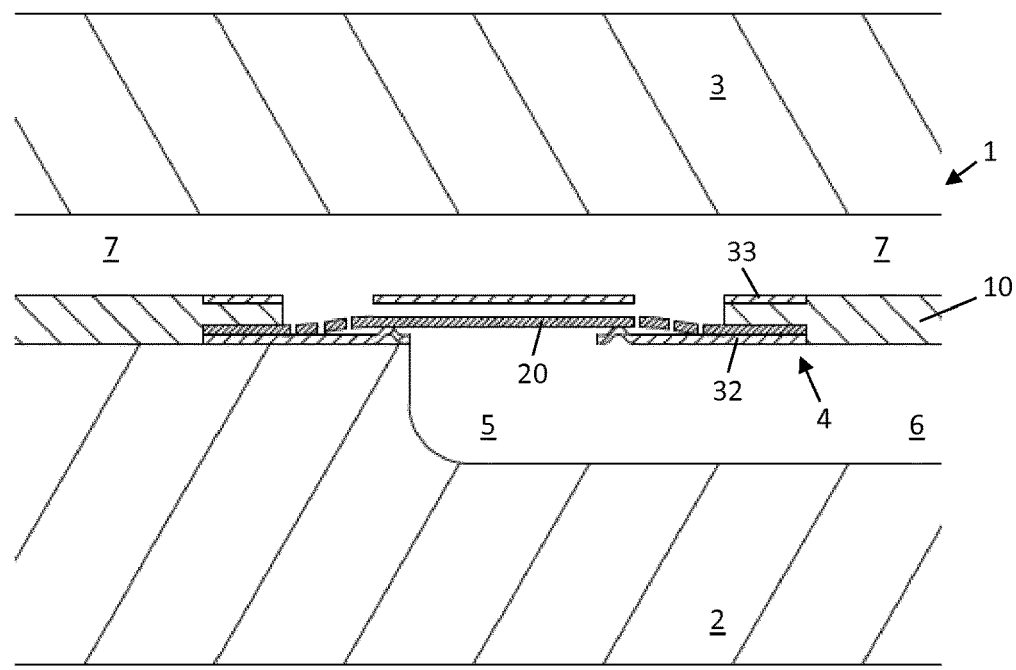

FIG. 6 shows a further transmission control device 1 which is designed in a similar manner to that of FIGS. 4 and 5. In particular, the transmission control plate 4 is designed in an identical manner. In the transmission control device 1, however, the channel 7 extends beyond the through-flow opening 5. Starting from the through-flow opening 5, the channel therefore extends in two opposite directions.

Figure 7:
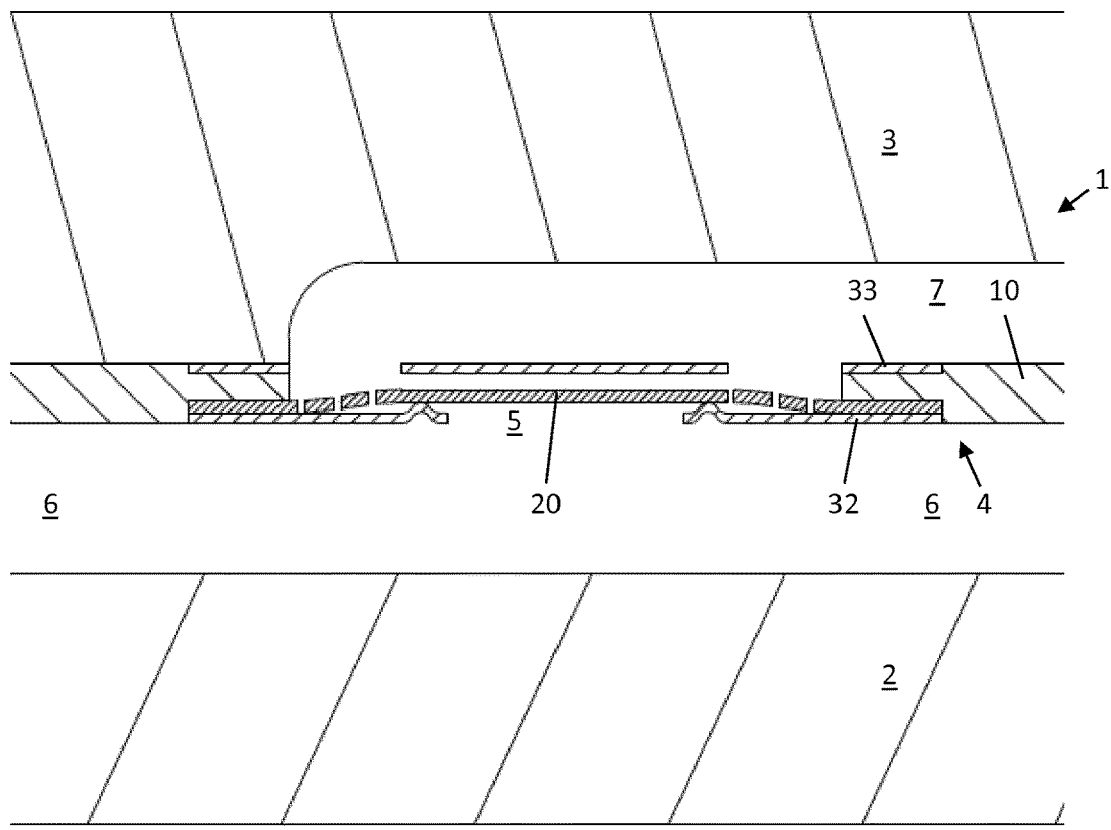

A further transmission control device 1 which is designed in the manner of that in FIG. 6 is illustrated in FIG. 7. In particular, the transmission control plate 4 is designed identically. In contrast to FIG. 6, however, the channel 7 in the upper box now extends parallel to the layer plane of the transmission control plate 4 in only one direction, whilst the fluid channel 6 supplying the fluid extends on both sides of the through-flow opening 5.

Figure 8:
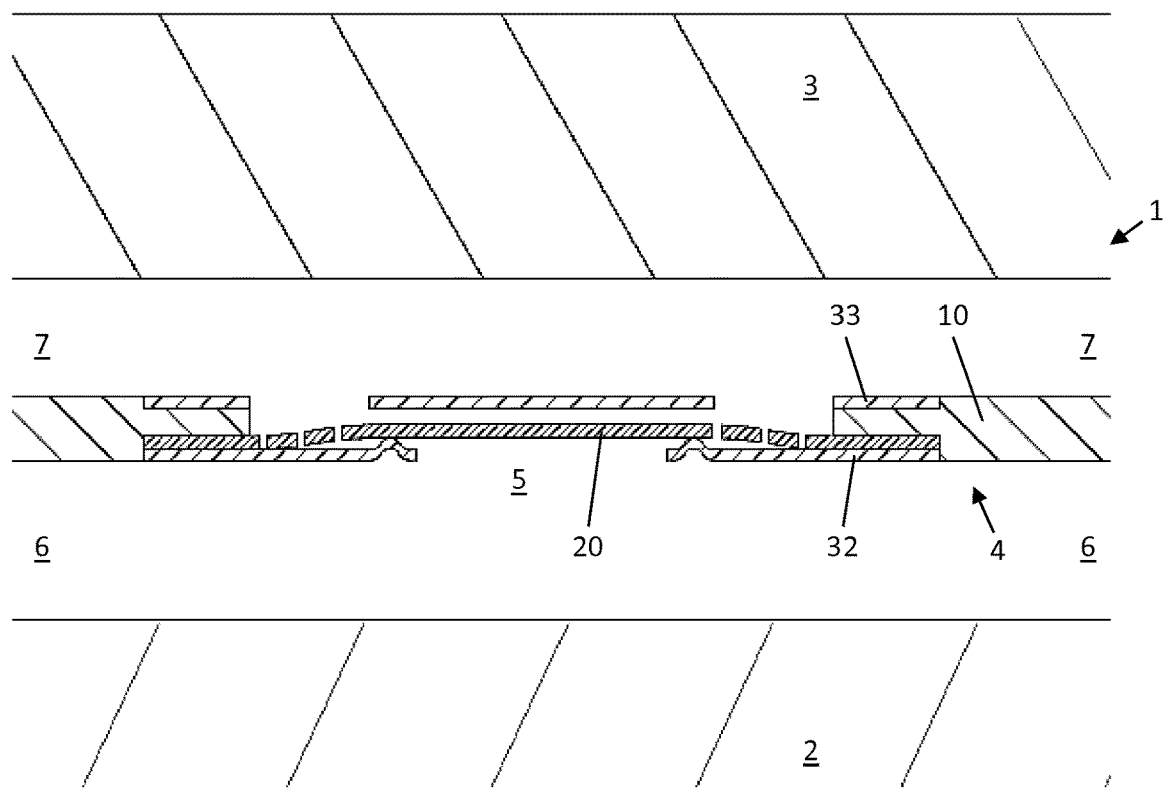

FIG. 8 shows a further transmission control device as illustrated in FIGS. 6 and 7. In particular, the transmission control plate 4 is in turn designed identically. However, both channels 6 and 7 now each extend on both sides of the through-flow opening 5.

Figure 9:
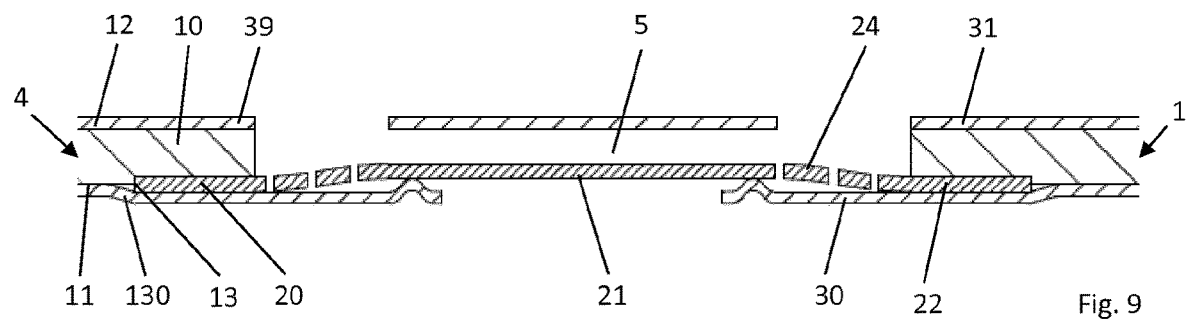
FIGS. 9 and 10 a partial view of different transmission control plates according to the invention in cross-section.

FIG. 9 shows a further embodiment of the transmission control plate 4 according to the invention. In this transmission control plate 4, the cutout 13 in the carrier layer 10 is less deep than the thickness of the holding region 22 of the spring element 20. The holding region 22 thus protrudes beyond the carrier layer on the first side 11 thereof. In the region in which an offset is produced starting from the carrier layer 10 in the direction of the spring element 20, the first functional layer 30 has an angled portion 130 which overcomes the projection of the holding region 22 beyond the carrier layer 10.

Figure 10:
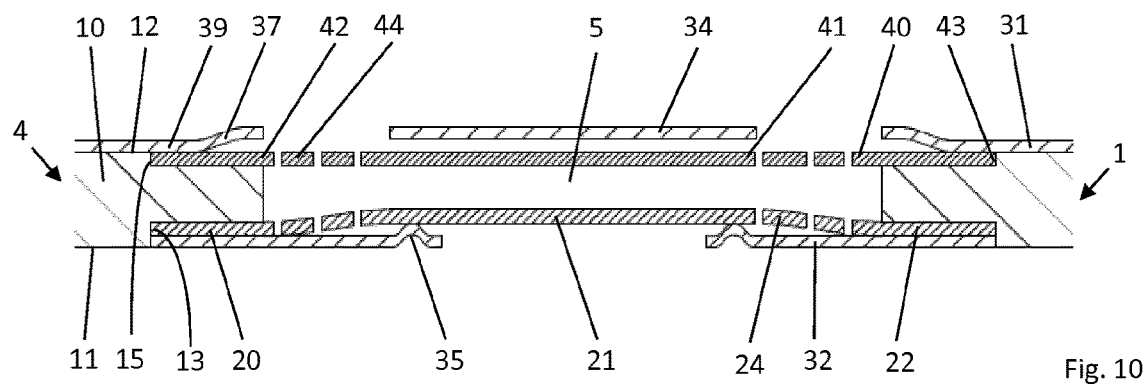

A further embodiment of the transmission control plate 4 according to the invention is illustrated in FIG. 10. This corresponds substantially to that of the transmission control plate 4 illustrated in FIG. 3. A second functional layer 31 is provided on the second side 12 of the carrier layer 10. This has a travel delimiting element 34 and a holding region 39, wherein the holding region 39 in turn has an angled portion 37 which spaces the travel delimiting element 34 from the carrier layer 10 in the perpendicular direction with respect to the plane of the carrier layer. The second functional element in FIG. 3 is now designed as a second spring element 40. This second spring element 40 has a spring plate 41, holding arms 44 and a holding region 42, wherein the holding arms 44 are designed with respect to the holding arms 24 of the first spring element 20 such that spring rate of the spring element 40 is higher than the spring rate of the spring element 20.

If (as seen in the drawing) fluid now flows against the spring plate 21 from below (i.e. from the first side 11), the spring plate 21 is deflected in the direction of the spring plate 41. With sufficient pressure on the spring plate 21, this will lie against the spring plate 41 and then deflect the spring plate 41 further until the spring plate 41 abuts against the travel delimiter 34. As a result of this stepped travel delimitation for the spring plate 21, the effective opening characteristics of the spring element 20 can be set individually.

Figure 11:
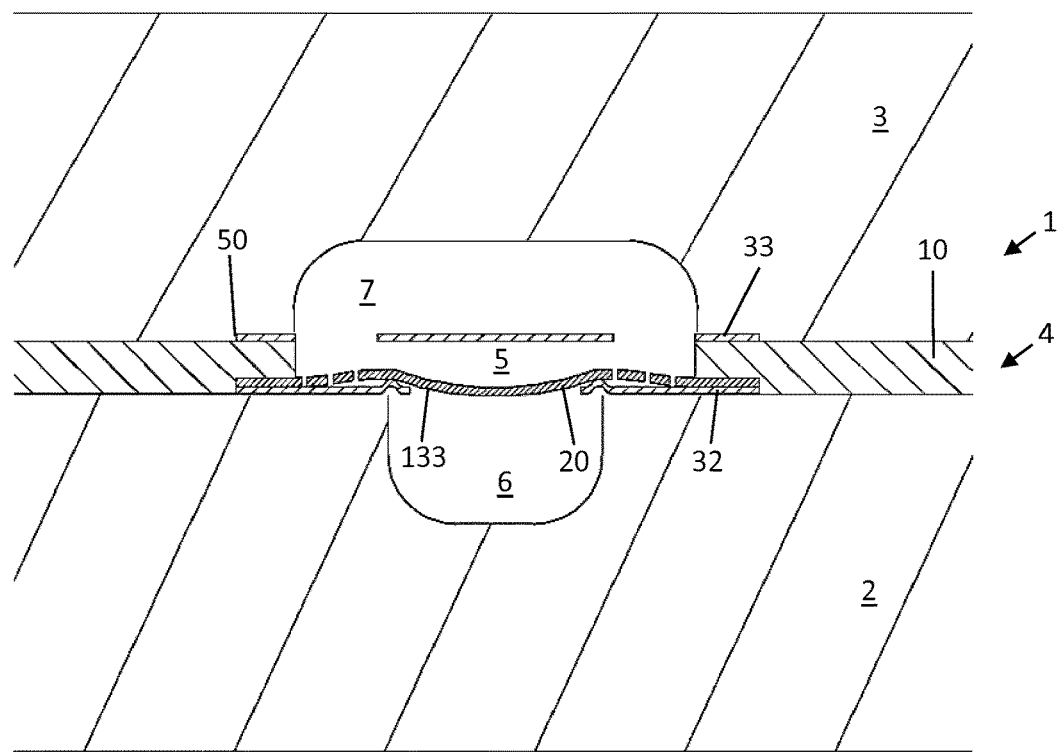
FIGS. 11 and 12 a partial view of different transmission control devices according to the invention in cross-section.

FIG. 11 shows a further transmission control device 1 which is designed in a similar manner to that illustrated in FIG. 5. A difference between this transmission control device 1 in FIG. 11 and that in FIG. 5 is that a second recess for the second functional element 33 is not provided in the carrier layer 10. Instead, a recess 50 in which the holding regions of the second functional element 33 are embedded is located in the upper box 3. The spring element 20 furthermore has a concave curvature protruding in the direction of the first functional element 32. The convex opposite side thereof reduces the flow resistance on the surface of the spring plate 21 which faces the channel 6.

Figure 12:
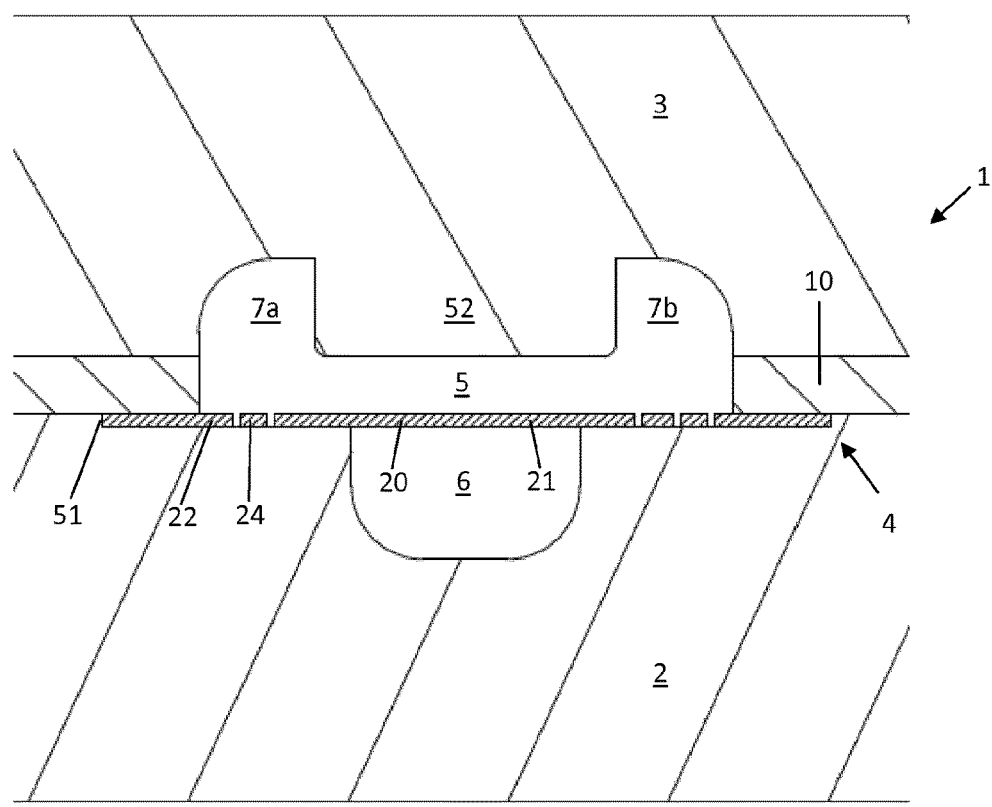

FIG. 12 shows a further transmission control device 1 which is designed similarly to the transmission control device 1 of FIG. 2.

Corresponding to claim 26, the transmission control plate 4 now has only one carrier layer 4 and one spring element 20. A first functional layer or second functional layer or first functional elements or second functional elements are not provided in this embodiment. In contrast to the previous embodiments, the carrier layer 10 of the transmission control plate 4 now has no recess. A recess 51, which receives the spring element 20, is instead provided in the first counter-component, the lower box 2. At the same time, the lower box 2 also forms the seat for the spring plate 21. The carrier layer 10 and the spring element 20 are connected to one another with material fit, namely welded, although they could also each be arranged individually in an alternative embodiment. Whilst FIG. 12 shows a flush termination between the spring element 20 and the recess 51, the components can also be installed at a slight spacing from one another, which is advantageous in terms of manufacturing tolerance.

The upper box 3 is in turn constructed such that a travel delimiting element 52, which delimits the travel of the spring plate 21 under the application of pressure from the channel 6, is formed centrally over the through-opening 5 in the channel 7 which is now formed by sub-channels 7a and 7b.

Figure 13:
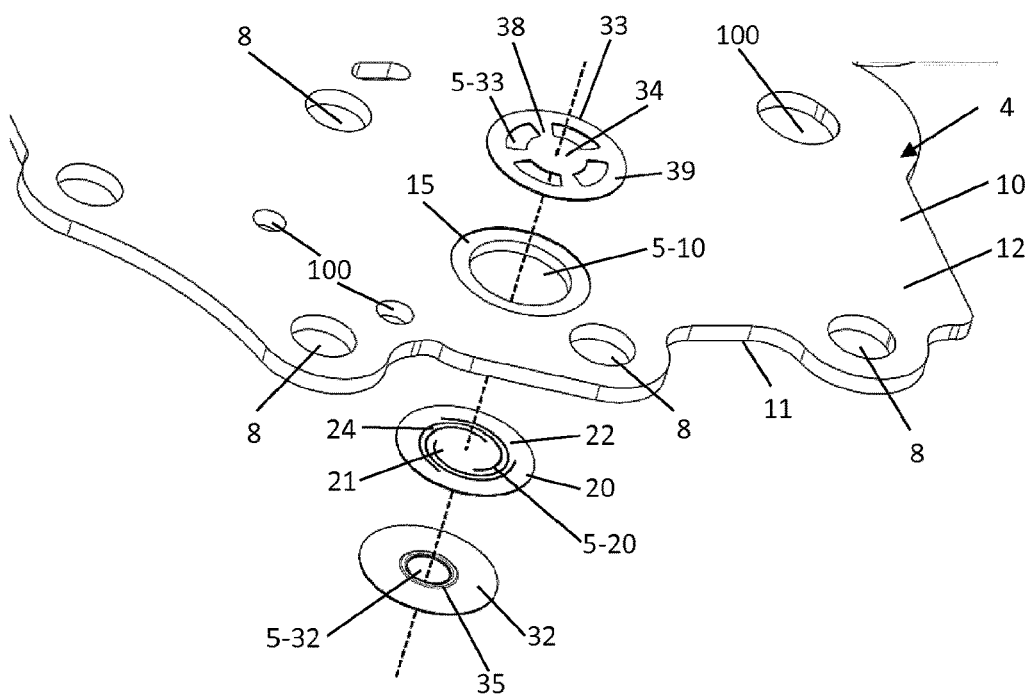
FIG. 13 an exploded illustration of a detail of a transmission control plate according to the invention.

FIG. 13 shows a detail of a transmission control plate 4 as an exploded drawing. The carrier layer 10 has screw holes 8, fluid through-openings 100 and, illustrated in this detail here, a fluid through-opening 5-10 for forming a valve. In overview, it is possible to see the recess 15 as is illustrated in a corresponding manner for example in FIG. 2. A second functional element 33 is arranged in this recess 15, wherein the holding region 39 of the second functional element 33 would come to lie in the recess. The second functional element 33 has, starting from the holding region 39, four holding arms 38 which are arranged at the same spacing around the circumference of the second functional element 33 and merge radially inwards, in one piece, into a travel delimiting element 34.

The spring element 20 with its holding region 22, the spirally arranged holding arms 24 and the spring plate 21 is located on the lower side of the carrier layer 10, adjacent to the side 11. A first functional element 32, whereof the through-flow opening 5-32 has a considerably smaller inner width than the inner width of the through-flow opening 5-10, is arranged below the spring element 20. The inner edge of the through-flow opening 5-32 has a smaller diameter than the outer diameter of the spring plate 21. The spring plate 21 is thus seated on the circumferential edge of the through-flow opening 5-32 of the first functional element 32 in the closed state. In FIG. 13, a profile 35 is furthermore illustrated along the circumferential edge around the through-flow opening 5-32 in the first functional element 32. This profile rises out of the first functional element 32 in the direction of the spring element 20. It can be designed for example as a bead, wherein the flanks of the bead are tapered according to the invention. This bead serves for pre-tensioning and effective sealing with respect to the spring plate 21.

Figure 14:
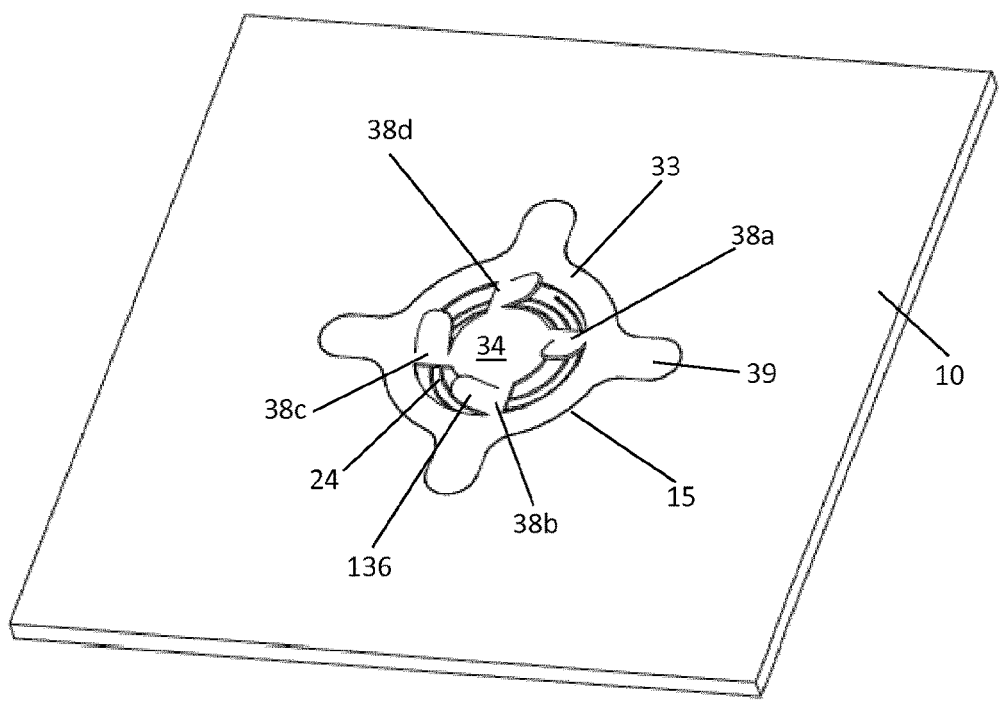
FIG. 14 a detail of a transmission control plate according to the invention.

FIG. 14 now shows an overview of a transmission control plate 4 according to the invention in a phantom view. In an overview of the carrier layer 10 and the second functional element 33, the latter has travel delimiting elements 34 which are fixed to the surrounding region 39 of the second functional element 33 via holding arms 38a to 38d. In the through-flow spaces which remain open between the holding arms 38, the functional element 33 furthermore has flow guiding elements 136 which set a fluid flowing through into clockwise rotation. The holding arms 24 of the spring element 20 can be seen through the regions which are left open by the flow guiding elements 136. It is clear from FIG. 14 that, unlike in FIG. 13, the second functional element 33 can have outer edges which do not extend projecting concentrically to the through-flow opening in the carrier layer 10. Instead, the functional element 33 has arms here, which facilitate durable fastening. Analogous outer contours are likewise possible for both the first functional element 32 and the spring element 20.

Figure 15A:
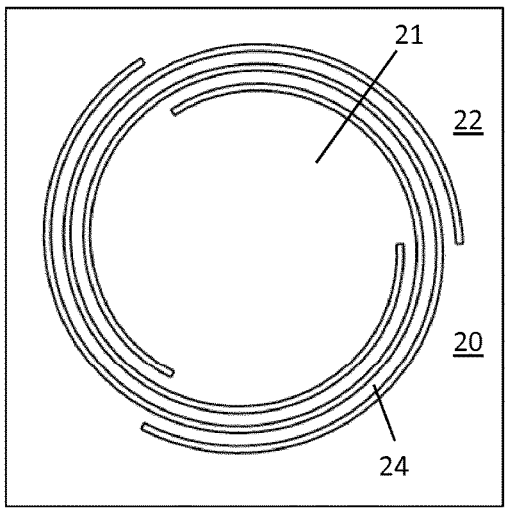
FIG. 15 different embodiments of spring elements in transmission control devices according to the invention.
Figure 15D:
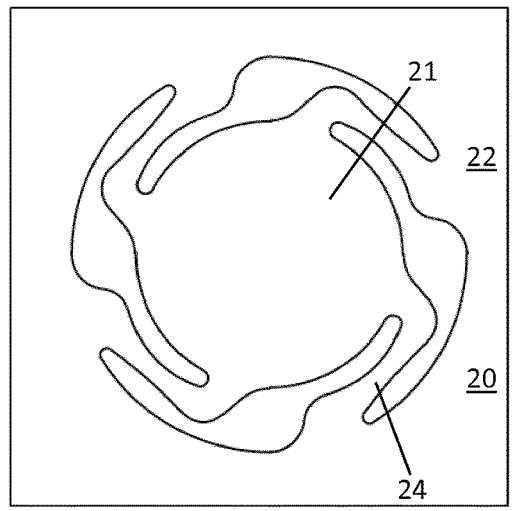
Figure 15B:
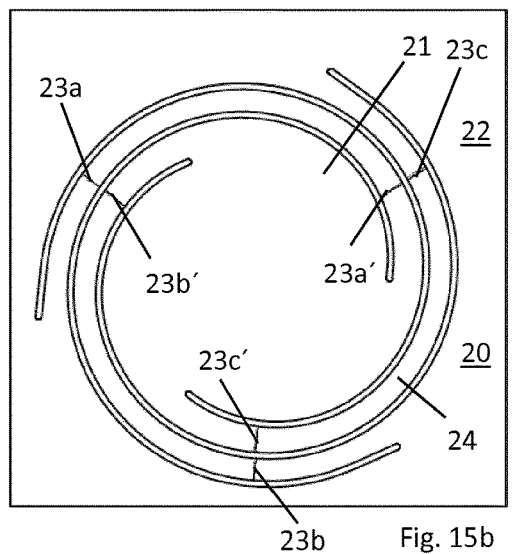
Figure 15E:
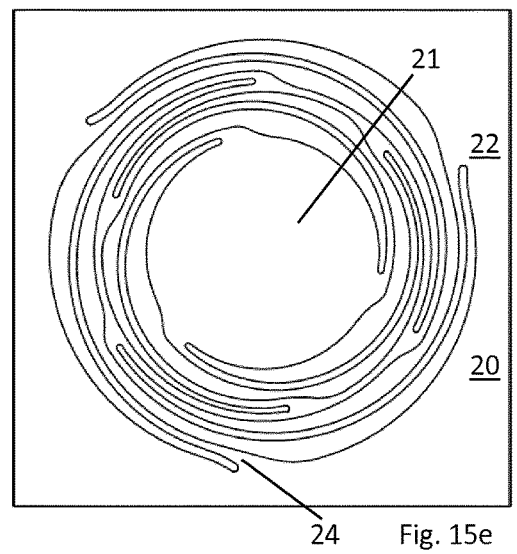
Figure 15C:
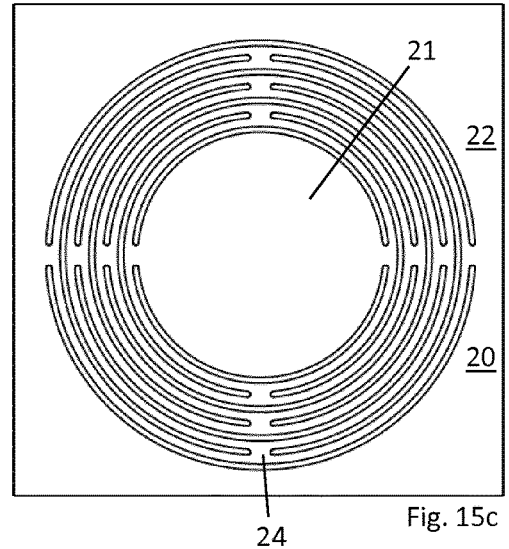

FIGS. 15a to 15f show different embodiments for the first spring element 20. They can be applied analogously to a second spring element 40 which is present where applicable. The individual embodiments in FIGS. 15a to 15f differ substantially in terms of the design of the holding arms 24. These are arranged concentrically spirally in FIG. 15a. In FIG. 15b, the holding arms 24 are likewise arranged concentrically spirally, although they are wider than the holding arms 24 in FIG. 15a and moreover have kinks or other pre-deformations 23a, 23b, 23c, 23a', 23b', 23c' which influence the spring behavior and therefore the opening behavior. Concentric holding arms 24 are illustrated in FIG. 15c, wherein successive holding arms 24 are connected to one another in each case at two opposite points. For successive connecting points in the radial direction, the connecting points are each offset from one another through 90°.

Concentrically circumferential holding arms 24 are likewise illustrated in FIG. 15d, which have a particular form so that the open area remaining between the holding arms 24 for the fluid is sufficiently large.

Similar holding arms 24 to those in FIG. 15d are illustrated in FIG. 15e, although they are greater in number and the holding arms 24 are moreover branched.

Figure 15F:
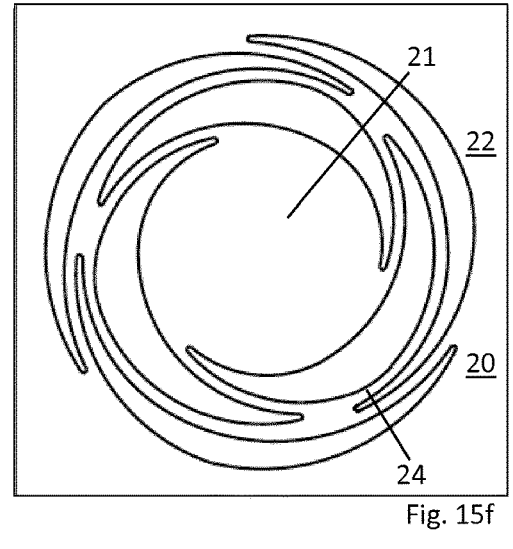

Concentric, branched holding arms 24 are also illustrated in FIG. 15f, which together create sickle-shaped through-flow regions for the fluid in each case.

Different embodiments for a second functional layer 31 or a second functional element 33 having a travel delimiting element 34 are illustrated in FIG. 16. The illustration relates to a second functional layer 31, but can be applied directly to a second functional element 33, i.e. a through-flow opening 5-33 would apply instead of a through-flow opening 5-31.

Figure 16A:
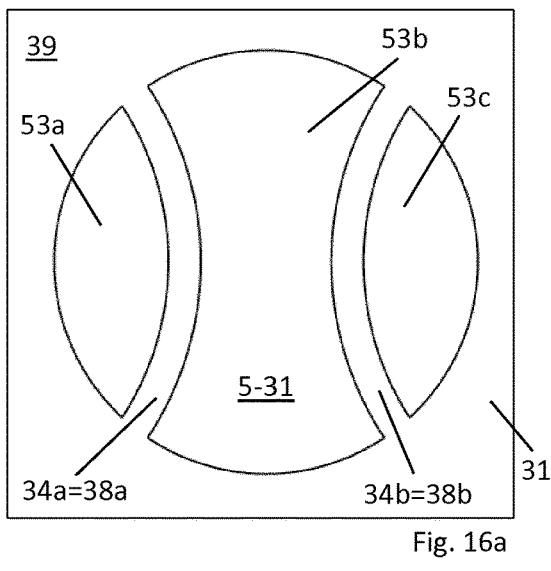
FIG. 16 different embodiments of second functional layers or second functional elements according to the invention for use in transmission control devices according to the invention.

In FIG. 16a, the travel delimiting element is realized by two bent travel delimiting elements 34a and 34b in the form of webs spanning the through-flow opening 5-31. The centers of the two connecting points for each web are each offset from one another through ca. 120°.

Figure 16D:
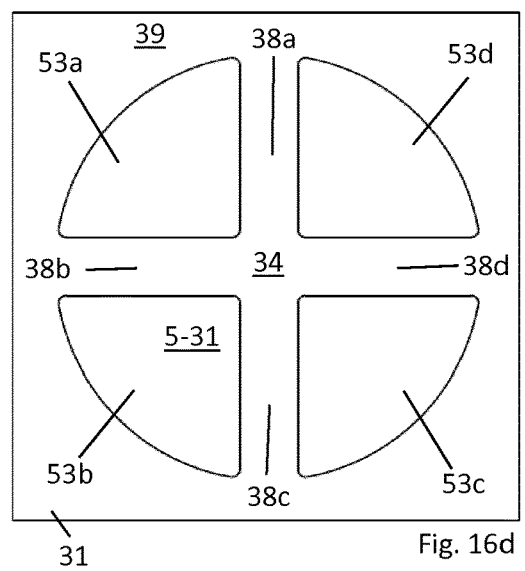
Figure 16B:
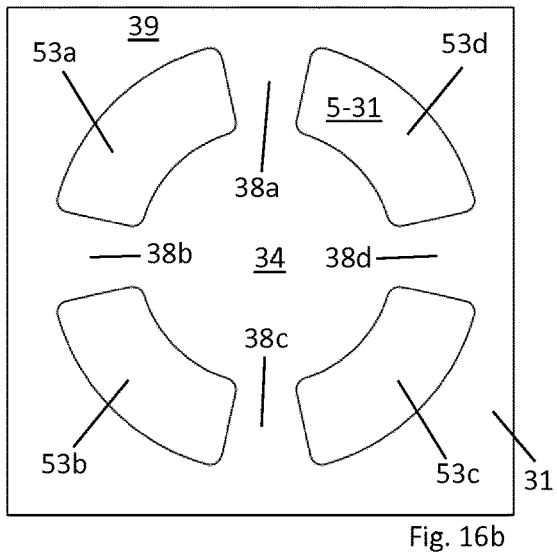

In FIG. 16b, a travel delimiting element 34 is connected to the holding region 39 of the second functional layer 31 or the second functional element 33 via holding arms 38a to 38d. The holding arms are each offset from one another through 90°. They create a total of four through-flow regions 53a to 53d between them.

Figure 16E:
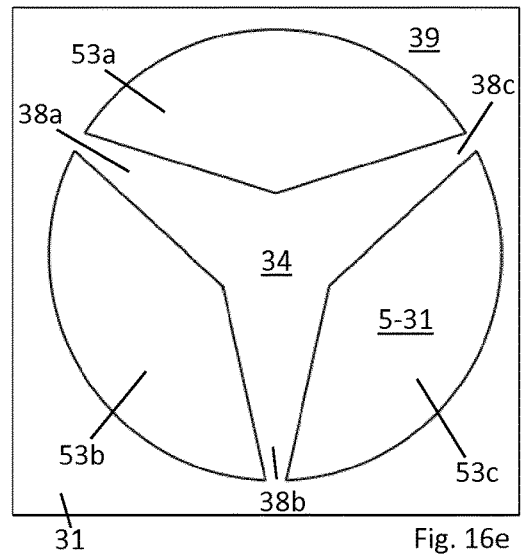
Figure 16C:
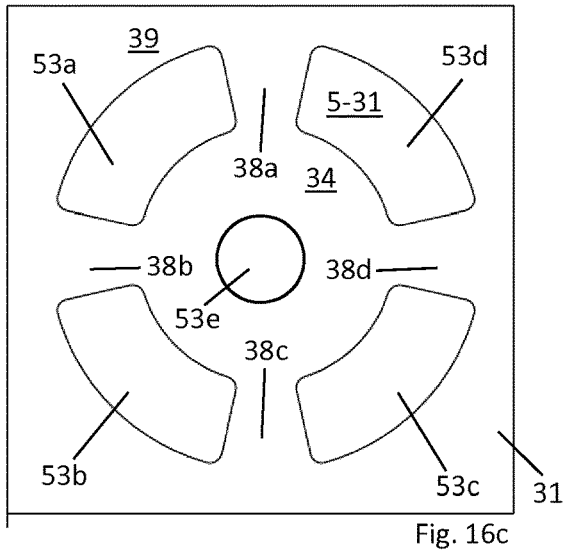

A modification of the arrangement of FIG. 16b is illustrated in FIG. 16c. The travel delimiting element 34 has an additional through-flow opening 53e in the center, which can be closed by a spring plate lying against it.

FIG. 16d shows a further travel delimiting element, which has two mutually overlapping webs comprising sub-arms 38b and 38d and 38a and 38c. These webs meet in the center and form the travel delimiting element 34.

A modification of the design of FIG. 16d is illustrated in FIG. 16e. It is now the case that, instead of using four arms, which together form two webs spanning the through-flow opening, only three arms 38a to 38c are used, which meet centrally in the through-flow opening and thus form a star-shaped travel delimiting element 34.

Figure 16F:
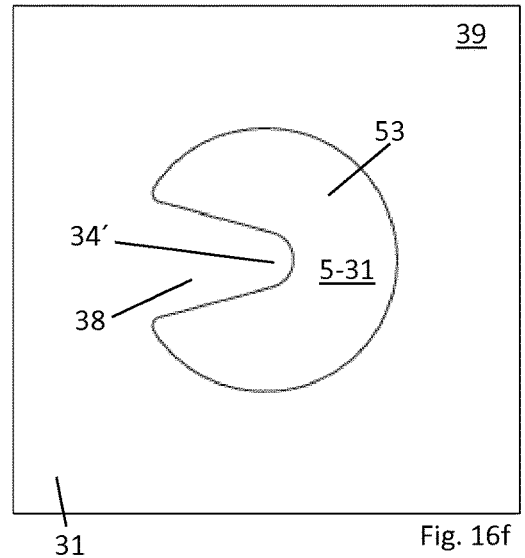

FIG. 16f shows a further embodiment of a second functional layer 31. This has a single arm 38 jutting into the through-flow opening 5 as a travel delimiting element 34'. This arm has a width and thickness which afford it the necessary stability as a travel delimiting element and, to this end, is preferably formed in the carrier layer 10. In particular, it is connected to the circumferential edge of the through-opening 5 in the second functional layer 31 via a segment of ca. 30° along the said circumferential edge.

FIG. 17 shows six exemplary embodiments 17a to 17f of seating and/or sealing elements 35a to 35f as a seat, a sealing element and for generating a pre-tension for the spring plate 21, in each case in a sectional illustration of a section through the respective circumferential seating and/or sealing element 35, wherein the through-flow opening 5 borders the illustrated portion to the right in each case. As is further shown in the following Figures, analogous elements can also be formed in or on the spring element 20 itself. They are denoted there by 26.

Figure 17A:
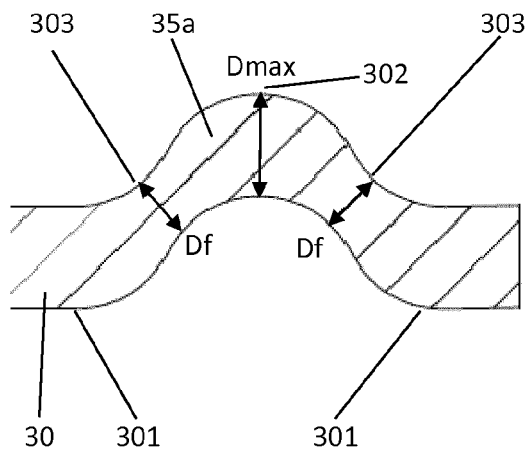
FIG. 17 different embodiments of the seating and/or sealing element for use in transmission control devices according to the invention.

FIG. 17a shows a bead 35 as already formed in the previous exemplary embodiments of the transmission control system 1 in the first functional layer 30 or in the first functional element 32. Between two bead feet 301, the bead has two sloping flank regions 303 and a bead head 302. The material thickness—perpendicularly to the neutral axis of the sheet—is reduced here in the region of the bead flanks by more than 25% with respect to the material thickness in the region of the bead head, which corresponds substantially to the material thickness in the region of the bead feet: $D_F < 0.75\ D_{max}$. This tapering of the flanks results in an increase in the rigidity of the bead, which results in particularly good sealing and reliable seating of the spring plate precisely in the region above and/or below the channels.

Figure 17D:
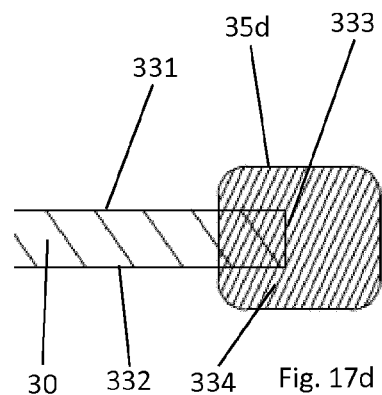
Figure 17B:
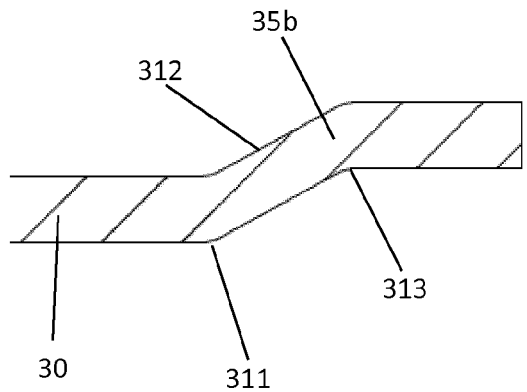

FIG. 17b shows a half bead 35b as a seating and/or sealing element 35. This half bead has a sloping region 312 between two kink points 311, 313.

Figure 17E:
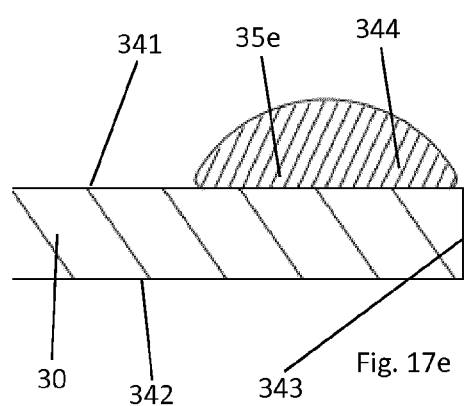
Figure 17C:
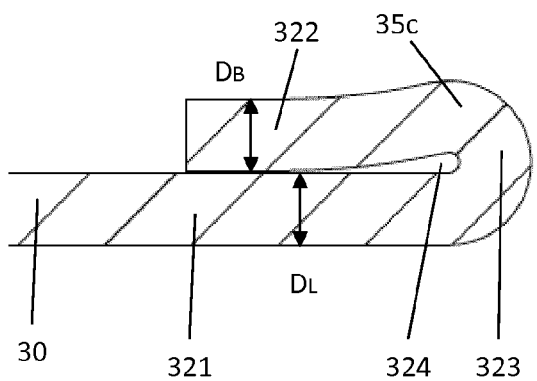

FIG. 17c shows a flanged seating and/or sealing element 35c. For this, the edge region 322, i.e. the free end of the layer 30, is folded back onto the region 321. This forms a new, bent edge 323. Depending on the extent of the folding, a clearance 324 can remain between the flanged region 322 and the adjacent region 321. As such, the flanged seating and/or sealing element 35c already has sufficient rigidity to bridge channels. To further increase this rigidity, the flanged region 322 can be tapered so that $D_B<D_L$.

Figure 17F:
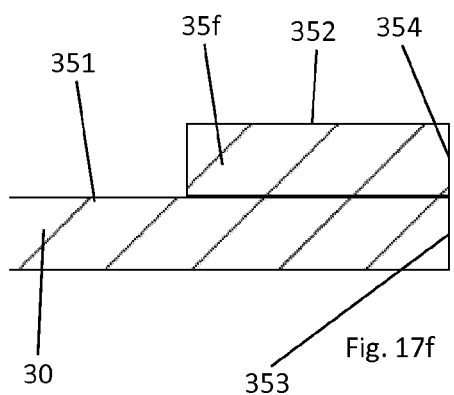

Whilst the embodiments of FIGS. 17a to 17c form the seating and/or sealing element 35 from the material of the layer 30 itself, FIGS. 17d to 17f illustrate embodiments in which an additional element forms the seating and/or sealing element 35. This is an elastic element extending annularly around the through-opening (FIGS. 17d and 17e) or an annularly extending metal element (FIG. 17f).

In the exemplary embodiment of FIG. 17d, an elastic element 334 is applied as a seating and/or sealing element 35d at the edge 333 facing the through-opening, which elastic element extends from the upper side 331 of the layer 30 over the side edge 333 to the lower side 332 and results in a vertical exaggeration of both surfaces 331 and 332. By contrast, in the exemplary embodiment of FIG. 17e, the elastic element 344 only extends on that surface 341 of the layer 30 which faces the spring element 20 in the installed situation; the side edge 343 and the lower side 342 remain uncovered.

Finally, in FIG. 17f, a metal ring 352 is applied to the surface 351 of the layer 30, whereof the edge 354 terminates flush with the edge 353. The thickness of the ring 352 and the layer 30 is substantially identical here, although it could be selected differently. It is likewise possible to use identical metal sheets or sheets made from different metals. The ring 352 is preferably fastened to the layer 30, in particular fastened with material fit, and preferably welded to the layer 30.

Figure 18:
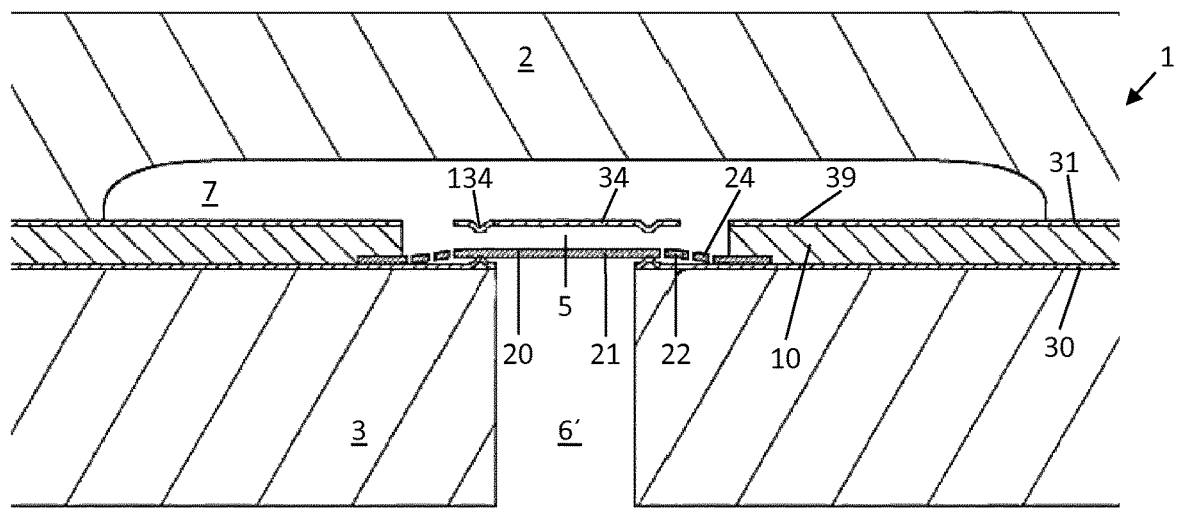

FIG. 18 shows a further embodiment of a transmission control device according to the invention, which, in terms of the construction of the transmission control plate 4, corresponds substantially to that of FIG. 1. With regard to the installed situation or position relative to the channels, this embodiment corresponds substantially to that of FIGS. 4 and 5. By contrast with FIGS. 4 and 5, however, the lower box 3 does not have, in the region of the valve, a channel extending parallel to the plane of the transmission control plate, but a bore 6' which is perpendicular to the plane of the transmission control plate 4. In the illustrated region, the transmission control plate is therefore seated circumferentially around the through-flow opening 5 on the lower box 3, but is not supported by the upper box 2 in the region of the channel 7, so that the reproducible valve function is ensured simply by the construction-related inherent stability of the transmission control plate in the region of the valve.

The embodiment of FIG. 18 furthermore differs from FIG. 1 in that the travel delimiting element 34 has knob-shaped stamped portions 134 which reduce the flow resistance. In addition, they increase the surface of the travel delimiting element 34 and reduce the contact area of the spring element 20 and travel delimiting element 34.

FIG. 19 again illustrates an embodiment, similar to FIG. 1, of a transmission control plate 4 which is integrated in a transmission control device 1 according to the invention, which is constructed similarly to that in FIGS. 4 and 5, but in which a bore 7' extending perpendicularly to the plane of the transmission control plate 4 is now provided in the upper box 2 instead of a channel 7. The channel 6 in the lower box 3 is open to the right. In the region around the valve, a circumferential region still remains which is not supported by both control boxes 2, 3 and is afforded its leak-tightness and durably reproducible valve and orifice function simply as a result of the inherent stability of the transmission control plate 4. Instead of a closed spring plate 21, this embodiment has an orifice opening 25 in the spring plate 21, which enables a restricted fluid flow against the main flow direction of the valve through the through-opening 5.

Figure 19:
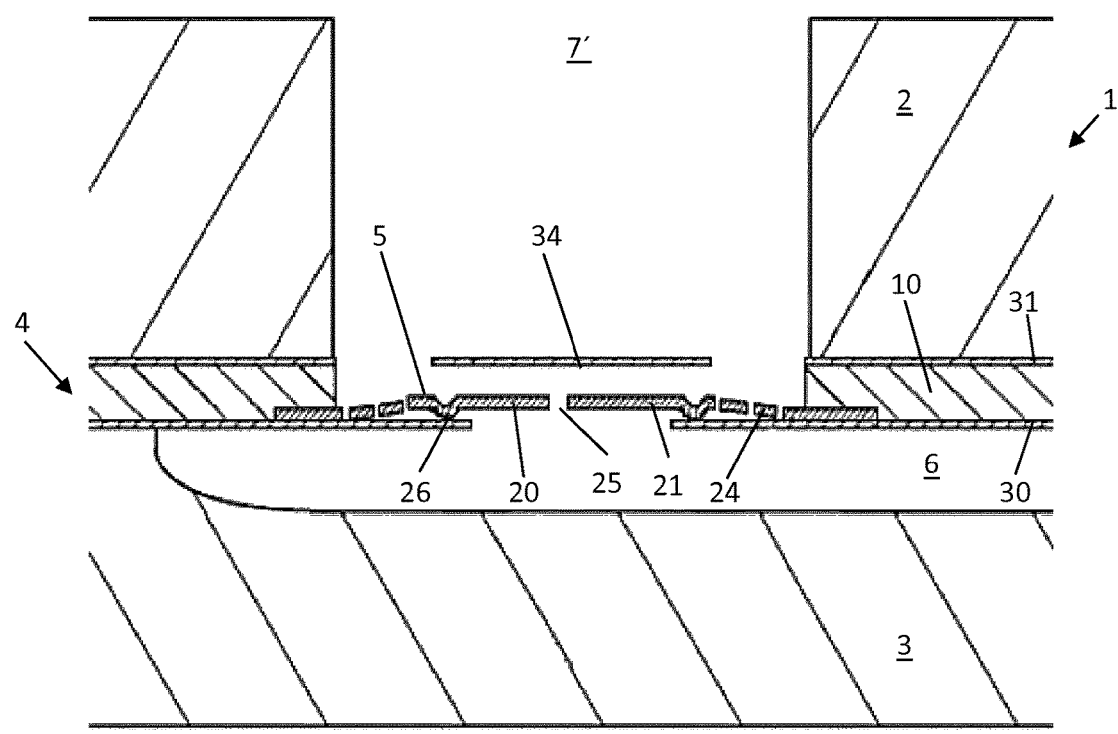

FIG. 19 furthermore differs from the previous embodiments in that the seat 26 for the spring plate 21 is now formed in the spring plate 21, i.e. in the spring element 20, instead of in the first functional layer 30. This can be preferred over a seat 35 in the first functional layer 30 for manufacturing reasons or due to space constraints in some applications. The support 26 in turn serves for sealing and pre-tensioning the spring plate 21.

FIG. 20 shows a further exemplary embodiment of a transmission control plate 4 for use in a transmission control device 1 according to the invention, wherein the portion shown has two through-openings 5a and 5b. A valve device which corresponds to the exemplary embodiment of FIG. 3, is formed in both through-openings, wherein the arrangement in the region of FIG. 5b is the mirror-inverse of the arrangement in FIG. 3.

FIG. 21 shows a further exemplary embodiment of a transmission control plate 4 for use in a transmission control device 1 according to the invention. The cross-sectional detail, illustrated in FIG. 21, through the transmission control plate 4 in turn shows a carrier layer 10. This carrier layer 10 has a first side 11 and a second side 12, wherein a first recess 13 in the first side 11 and a second recess 15 in the second side are provided circumferentially around a through-opening 5. A spring element 20 and a first functional element 32 are arranged in the first recess 13. A sieve layer 60 and a second functional element 33 are arranged in the second recess 15.

The spring element 20 is designed as in the previous examples. However, the connecting elements 24 are designed with a smaller thickness with respect to the holding region 22 of the spring element 20 which surrounds it. It is possible to influence the elastic behavior of the spring plate 21 by varying the strength or thickness of the connecting elements 24. Thinner connecting elements 24 are more easily deformable whilst thicker connecting elements 24 offer a greater resistance to a deflection of the spring plate 21 from its idle position.

The spring plate 21 is in turn thinned in the central region 210. This reduces the inert mass of the spring plate 21 and thereby influences its deflection behavior. A sieve element 60 is located between the stop 34 in the second functional element 33 and the spring plate 21. If hydraulic oil, for example, flows through the through-opening 5, this hydraulic oil also flows through the sieve layer 60 and is thereby freed of coarse particles.

Figure 22:
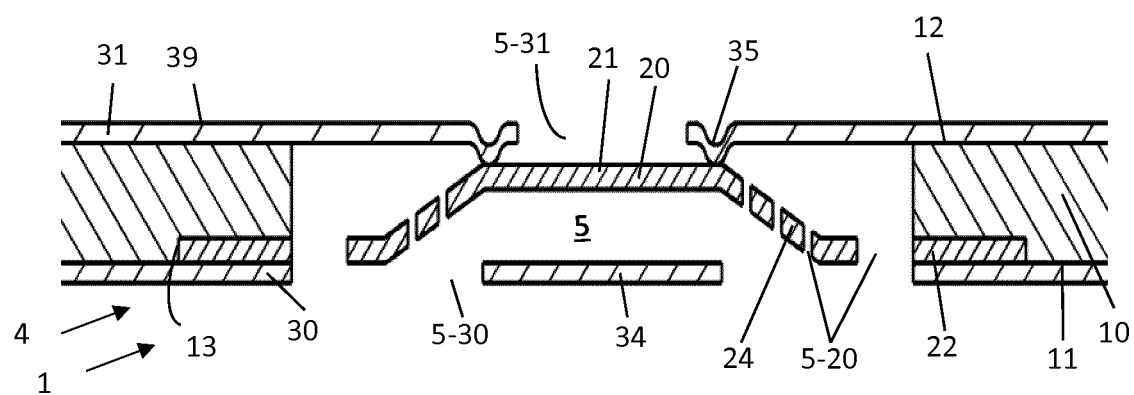

FIG. 22 shows a transmission control plate 10 which is designed similarly to that in FIG. 1. In contrast to FIG. 1, the second functional layer 31 now has a passage opening 5-31 instead of a stop or travel delimiting element. At its through-opening 5-31, along its circumferential edge, the second functional layer 31 is provided with a circumferential sealing bead 35 as a seating bulge for the spring plate 41. In the manner described above, the spring element 20 has a spring plate 21 which is connected to holding regions 22 via connecting elements 24. The spring plate 21 is pre-tensioned such that it is seated on the circumferential sealing bead 35 of the second functional layer 31 in the idle position.

If fluid now flows through the through-opening 5 from the second side 12 to the first side 11, the spring plate 20 lifts off the sealing bead 35 and enables the fluid to flow through the through-opening 5. With this, the openings between the holding arms 24 close so that the fluid flows mainly through the radially further-out opening 5-20 adjoining the holding region 22.

The travel of the spring plate 20 is delimited by a travel delimiting element 34 as part of the first functional layer 30. This travel delimiting element 34 can be designed in the same way as the travel delimiting elements in the second functional layer or the second functional element in the previous embodiments.

The bearing of the spring plate 20 on the second functional layer 31 enables the through-flow direction of the valve according to the invention to be reversed.

Figure 23:
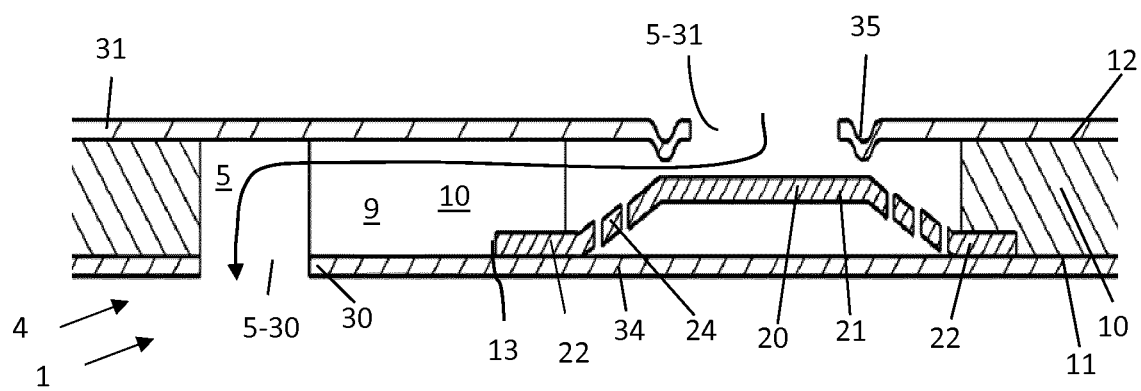

A transmission control plate 10 which is designed similarly to that in FIG. 22 is illustrated in FIG. 23. However, the through-flow opening 5-30 in the first functional layer 30 is arranged laterally offset from the through-flow opening 5-31 in the second functional layer 31 so that the flow path through the through-opening 5 is realized via the through-opening 5-31 between the sealing bead 35 and the spring plate 21 and then laterally further to the through-opening 5-30. The spring element 20 thus controls the passage of fluid from the through-opening 5-31 to the through-opening 5-30; however, the fluid does not flow through the clearances between the connecting elements 24. The first functional layer informally forms a travel delimiting element 34 for the spring plate 21 here.

Figure 24:
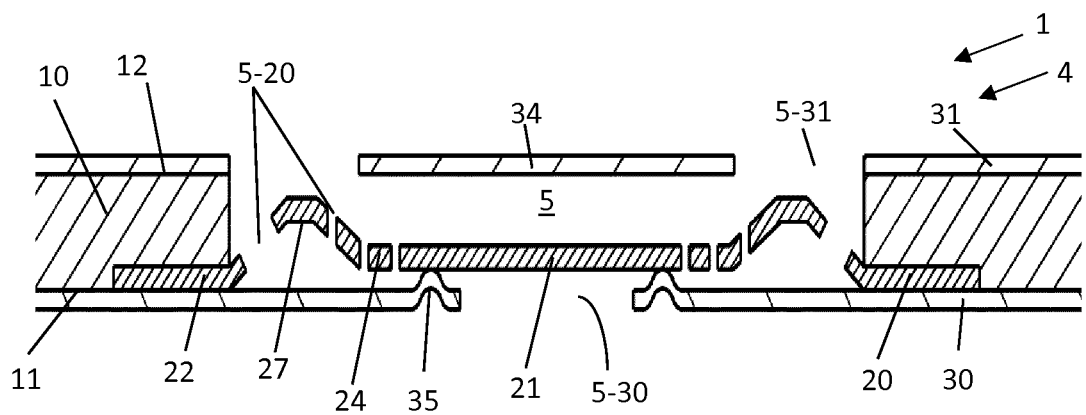

FIG. 24 shows a further transmission control plate 10, which corresponds substantially to that in FIG. 1. A circumferential bead 27 is now stamped into the connecting elements 24 in the region between the holding region 22 and the spring plate 21. This bead results in a pre-tensioning of the spring plate 21 in the direction of the sealing bead 35, which extends around the opening 5-30 in the first functional layer 30. The spring characteristic of the valve can be set or adjusted individually by means of such a stamped structure in this intermediate region between the holding region/element 22 and the spring plate 21.

Figure 25:
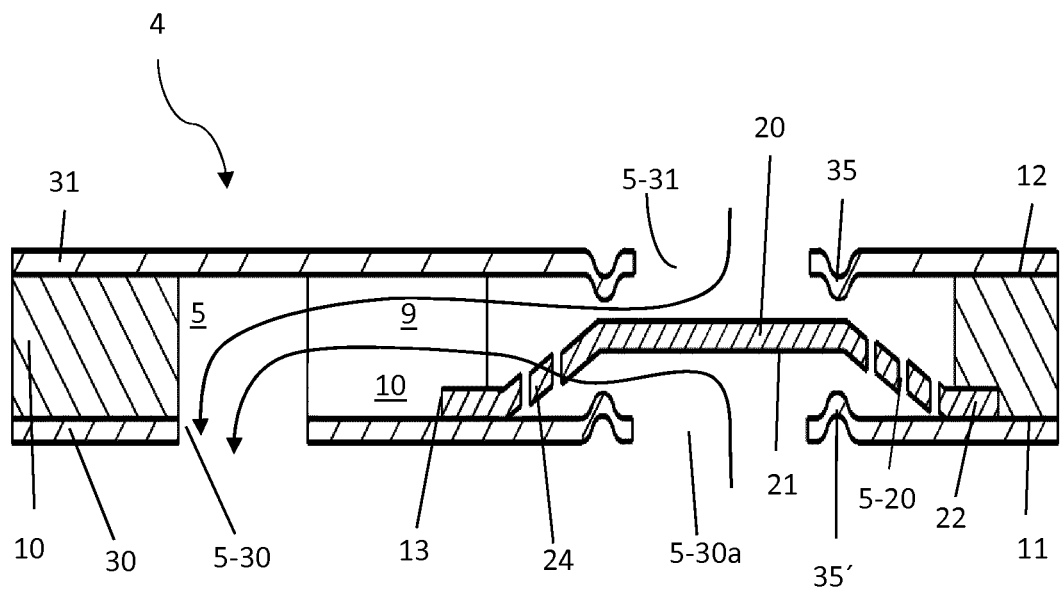

FIG. 25 shows a further embodiment of a transmission control plate according to the invention. This is similar to that in FIG. 23. In contrast to the embodiment of FIG. 23, the first functional layer 30 now has a further opening 5-30a which, in a projection of the transmission control plate onto its layer plane(s), is arranged within the spring plate 21. It is thus located opposite the through-opening 5-31 and can likewise be closed by the spring plate 21. Extending around the opening 5-30a, a bead-shaped seat 35' for the spring plate 21 is also provided in the layer 30 in the same manner as in the layer 31. This seat 35' also serves both for the reliable closing of the opening 5-30a by the spring plate 21 and for the pre-tensioning thereof in the seated state. The opening is thus opened for flows from the opening 5-31 to the opening 5-30 so long as fluid from the lower (in the Figure) surface does not exert pressure on the spring plate 21 at the opening 5-30a.

It is possible for media to pass between the opening 5-30a and the channel 8 through the openings 5-20 between the holding arms 24. Depending on the position of the spring plate 21, a flow of fluid through the opening 5-31, the channel 8 and the opening 5-30, or a flow of fluid through the opening 5-30a, the channel 8 and the opening 5-30 is possible. A simultaneous flow along both flow paths described above is also possible if the spring plate 21 is not seated on either the layer 30 or the layer 31.

The arrangement of FIG. 25 forms an "OR" valve in which, starting from one or both of the openings 5-30a and 5-31 acting as inlets, a flow through the channel is realized depending on the pressure ratios on the first side 11 and the second side 12 of the carrier layer 10.

Figure 26:
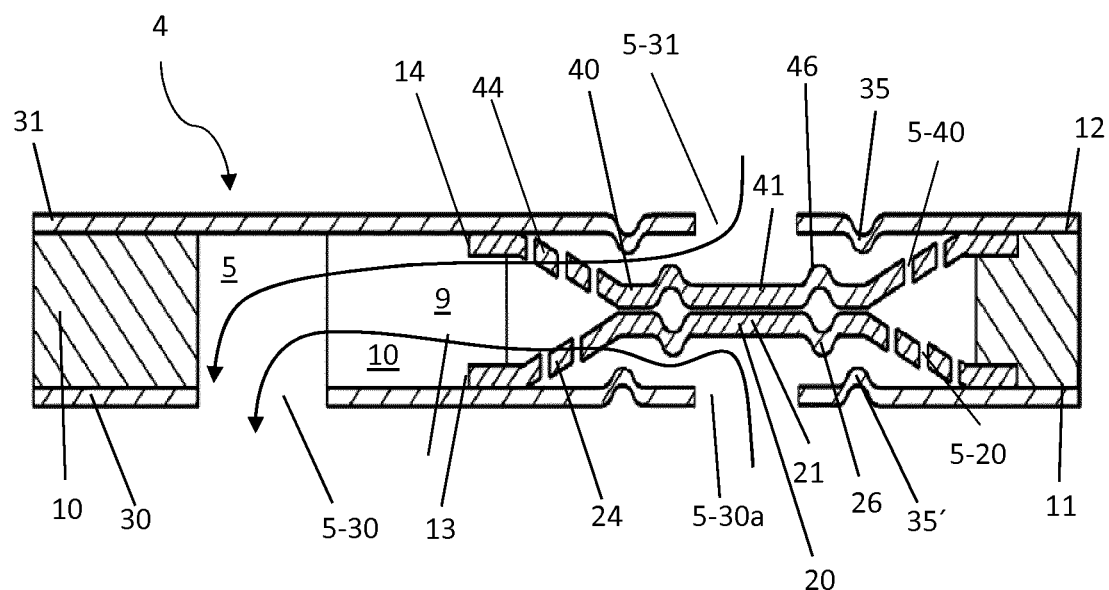

FIG. 26 shows a transmission control plate which is constructed similarly to that in FIG. 24. In addition, in a cutout 14 in the carrier layer 10 on the second side 12 of the carrier layer 10, a further spring element 40 is arranged between the carrier layer 10 and the second functional layer 31. This has a spring plate 41 in manner which is symmetrical (mirrored against the central plane of the carrier layer 10) with respect to the first spring element 20. The spring plates 21 and 41 each have (along the outer edge of the spring plates 21 and 41) circumferential seating elements 26 and 46 which are formed as a bead-shaped vertical exaggeration in the outward direction towards the adjacent functional layer 30 and 31. These seating elements 26 and 46 serve for the reliable and leak-tight seating of the spring plate 21 and 41 on the circumferential edge of the openings 5-30a and 5-31. Through appropriate selection of the areas enclosed by the seating elements 26 and 46, it is possible, with the same, but time-delayed, pressure at the through-openings 5-30a and 5-31, to determine the switching position for the initial signal (pressure) since, when one of the spring plates 21 and 41 is seated with the same pressure on both sides of the spring plate, the initial position is maintained owing to the area ratios of the spring plates 21 and 41 (the seated side has a smaller cross-section which is acted upon by the pressure).

The function in FIG. 25 is likewise realized at the same time here, i.e. a pressure-switched "OR" valve. Particular advantages of this embodiment are revealed in that the arrangement shown is symmetrical with respect to the central plane of the carrier layer and therefore exhibits the same behavior for pressure from the opening 5-31 as for pressure from the opening 5-30a.

The invention claimed is:

1. A transmission control device having two mutually oppositely arranged counter-components and a planar transmission control plate, which is arranged between mutually opposing surfaces of the two counter-components,
  wherein, formed between adjacently arranged surfaces of a respective counter-component and the transmission control plate, are fluid channels extending parallel to the plane of the respective surfaces and/or bores extending perpendicularly or substantially perpendicularly to the plane of the respective surface,
  wherein the transmission control plate has at least one through-flow opening for a fluid, which penetrates the transmission control plate and mutually connects fluid channels extending on different sides of the transmission control plate, or bores extending on different sides of the transmission control plate, or a fluid channel extending on one side of the transmission control plate and a bore extending on the opposite side of the transmission control plate,
  wherein the transmission control plate has at least one planar carrier layer,
  wherein the transmission control plate has at least one spring element having a spring plate and a holding region for the spring plate which is connected to the spring plate and surrounds it at least in some regions, and in that the carrier layer has, at least on a first side along a circumferential edge of the through-flow opening, a step-shaped first recess which is set back from the through-flow opening of the carrier layer in the surface of the carrier layer and in which the holding region is arranged at least in some regions;

wherein a layer of the transmission control device and/or a functional element of the transmission control device has at least one travel delimiting element for delimiting the travel of the spring plate, wherein the delimiting element is connected at at least two connecting points to the circumferential edge around the through-flow opening in the respective layer and/or in the respective functional element and the travel delimiting element, between the connecting points, in the orthogonal projection of the transmission control plate, is arranged within the through-flow opening, and at a spacing from the circumferential edge of the through-flow opening, in the respective layer and/or in the respective functional element, at least in some regions and is arranged from the spring plate in a flow-through direction.

2. The transmission control device of claim 1, wherein, in an orthogonal projection of the transmission control plate, the spring plate is arranged in the carrier layer within the through-flow opening of the carrier layer.

3. The transmission control device of claim 2, wherein the transmission control plate has at least one first functional element, which is arranged with its outer edge in the first recess, at least in some regions, and whereof the inner width of the through-flow opening of the first functional element is smaller than the inner width of the through-flow opening in the carrier layer, such that the holding region of the spring element is arranged between the first functional element and the carrier layer, at least in some regions, wherein, in the closed state of the through-flow opening, the spring plate is seated on a region of the first functional element which borders the circumferential edge of the through-flow opening of the first functional element.

4. The transmission control device of claim 3, wherein the transmission control plate has a first functional layer arranged adjacent to a first side of the carrier layer, wherein the holding region of the spring element is arranged in the first recess between the carrier layer and the first functional layer, at least in some regions.

5. The transmission control device of claim 4, wherein the carrier layer has, on a second side opposite the first side, along a circumferential edge of the through-flow opening, a step-shaped second recess which is set back from the through-flow opening.

6. The transmission control device of claim 5, wherein a region bordering the circumferential edge of the through-flow opening in the respective layer and/or in the respective functional element has a flange, a metal ring, a rubber element, a half bead, a full bead or a corrugated profile as a seat for the spring plate or, in its outer edge region, extending circumferentially at least in some regions, the spring plate has a flange, a metal ring, a rubber element, a half bead, a full bead or a corrugated profile as a seat in the closed state of the through-flow opening.

7. The transmission control device of claim 5, wherein the transmission control plate has at least one second functional element which is arranged with its outer edge in the second recess, at least in some regions.

8. The transmission control device of claim 7, wherein a second functional layer is arranged adjacent to the second side of the carrier layer.

9. The transmission control device of claim 8, wherein the second functional element and/or the second functional layer have a through-flow opening with an inner width smaller than the inner width of the through-flow opening in the carrier layer, such that, in the closed state of the through-flow opening, the spring plate is seated on a region bordering the circumferential edge of the through-flow opening.

10. The transmission control device of claim 8, wherein, between the holding region and the spring plate and circumferentially around the spring plate, the spring element is pre-tensioned and/or angled in the direction of the second functional element and/or in the direction of the second functional layer.

11. The transmission control device of claim 8, wherein the second functional element and/or the second functional layer have flow guiding elements, which, in the orthogonal projection of the transmission control plate, are arranged in the through-flow opening in the second functional element or the second functional layer and which are constructed such that they set a fluid flowing along the flow axis of the through-flow opening into rotational motion about this longitudinal axis.

12. The transmission control device of claim 8, wherein at least one pair, a plurality of pairs or all pairs of adjacent connecting points are arranged offset from one another along the circumferential edge through at least 85° relative to the center of the connecting points.

13. The transmission control device of claim 8, wherein at least one of the layers of the transmission control device and/or at least one of the functional elements of the transmission control device has at least one travel delimiting element for delimiting the travel of the spring plate, which has at least two webs which, in a projection of the transmission control plate perpendicularly to its planar extent, jut into the through-flow opening in the respective layer and/or in the respective functional element, wherein at least two of the webs are connected to one another at their ends which are opposite the circumferential edge of the through-flow opening and/or advantageously form a common web spanning the through-flow opening or a star having three or more web elements, wherein one or more webs or a star have a through-flow opening.

14. The transmission control device of claim 8, wherein at least one travel delimiting element has at least one web which juts into the through-flow opening, wherein the at least one web is connected in one piece to the circumferential edge of the through-flow opening in the respective layer and/or in the respective functional element over at least 25° of the circular circumference of the circumferential edge.

15. The transmission control device of claim 14, wherein the travel delimiting element is elastically mounted around the through-flow opening, in the region bordering the circumferential edge around the through-flow opening in the respective layer and/or in the respective functional element, and forms a resilient stop.

16. The transmission control device of claim 15, wherein the spring plate and the travel delimiting element have different spring rates, wherein the travel delimiting element has a higher spring rate than the spring plate.

17. The transmission control device of claim 15, wherein the travel delimiting element has stamped portions, which protrude in the direction of the spring plate and are arranged opposite the spring plate, and/or the spring plate has stamped portions, which protrude in the direction of the travel delimiting element and are arranged opposite the travel delimiting element, wherein the stamped portions comprise an at least partially circumferential bead or profile, or a metal ring, or a rubber element.

18. The transmission control device of claim 14, wherein the travel delimiting element has at least one stamped portion, which protrudes in the direction of the first or second functional element or the first or second functional layer and is arranged opposite the spring plate, and/or the spring plate has at least one stamped portion, which protrudes in the direction of the first or second functional element or the first or second functional layer and is arranged opposite the travel delimiting element, wherein the stamped portion comprises a cup-shaped stamped portion or knob-shaped stamped portions.

19. The transmission control plate of claim 14, wherein the travel delimiting element and/or the spring plate is concavely curved to project in the direction of the first or second functional element or the first or second functional layer.

20. The transmission control device of claim 8, wherein, as determined perpendicularly to a neutral axis of the respective layer, the respective functional element or the spring plate, the thickness of a flank, a plurality of flanks or all flanks of a half bead, a full bead or a profile is reduced with respect to the thickness of the respective functional element, the respective functional layer or the spring plate laterally adjacent to the full or half bead or the profile, by ≥15%, or, as determined perpendicularly to the neutral axis of the respective functional element, the respective functional layer or the spring plate, the thickness of a flanged region of a flange is reduced with respect to the thickness of that region of the respective functional element, the respective functional layer or the spring plate which borders the relevant flange, by ≥8%.

21. The transmission control device of claim 1, wherein the spring plate is connected in one piece to the holding element via a holding arm, two holding arms, three holding arms, four holding arms or more than four holding arms, wherein at least one holding arm is branched.

22. The transmission control device of claim 21, wherein the holding arms are formed as spiral holding arms which extend between the circumferential edge of the through-flow opening in the spring element and the outer circumferential edge of the spring plate, also along one of the circumferential edges.

23. The transmission control device of claim 21, wherein the holding arms have a predetermined spring characteristic perpendicularly to the plane of the through-flow opening, wherein the characteristic is a linear or non-linear spring characteristic.

24. The transmission control device of claim 12, wherein the transmission control plate has at least one second spring element having a second spring plate and a second holding region for the second spring plate which is connected to the second spring plate and surrounds it at least in some regions, wherein, on its second side opposite the first side, along the circumferential edge of the through-flow opening, the carrier layer has a second step-shaped recess which is set back from the through-flow opening and in which the second holding region is arranged at least in some regions.

25. A transmission control device comprising:
   two mutually oppositely arranged counter-components and a planar transmission control plate, which is arranged between mutually opposing surfaces of the two counter-components,
   wherein, formed between adjacently arranged surfaces of a respective counter-component and the transmission control plate, are fluid channels extending parallel to the plane of the respective surfaces and/or bores extending perpendicularly or substantially perpendicularly to the plane of the respective surface,
   wherein the transmission control plate has at least one through-flow opening for a fluid, which penetrates the transmission control plate and mutually connects fluid channels extending on different sides parallel to the plane of the transmission control plate, or bores, or a fluid channel extending on one side of the transmission control plate and a bore extending on the opposite side of the transmission control plate, wherein the transmission control plate has at least one planar carrier layer,
   wherein the transmission control plate has at least one spring element having a spring plate and a holding region for the spring plate which is connected to the spring plate and wherein the holding region surrounds the spring plate at least in some regions, and in that, at least on a first side facing the spring element, along a circumferential edge of the through-flow opening, the counter-component adjacent to the spring element has a step-shaped recess which is set back from the through-flow opening relative to the through-flow opening axial direction and in which the holding region is arranged at least in some regions;
   wherein at least one of the counter-components, or a layer of the transmission control device and/or a functional element of the transmission control device has at least one travel delimiting element for delimiting the travel of the spring plate, in a projection of the transmission control plate perpendicularly to its planar extent, is arranged within the through-flow opening and at a spacing from the circumferential edge of the through-flow opening, in the transmission control plate and/or in the respective layer and/or in the respective functional element, at least in some regions.

* * * * *

UNITED STATES PATENT AND TRADEMARK OFFICE
CERTIFICATE OF CORRECTION

PATENT NO. : 10,627,002 B2
APPLICATION NO. : 15/737468
DATED : April 21, 2020
INVENTOR(S) : Blersch et al.

Page 1 of 1

It is certified that error appears in the above-identified patent and that said Letters Patent is hereby corrected as shown below:

In the Claims

Claim 24, Column 19, Line 50, replace the number "12" with the number "21"

Signed and Sealed this
Fourteenth Day of July, 2020

Andrei Iancu
*Director of the United States Patent and Trademark Office*